United States Patent
Yu et al.

(10) Patent No.: US 11,645,723 B2
(45) Date of Patent: *May 9, 2023

(54) METHOD AND SYSTEM FOR GENERATING DYNAMIC USER EXPERIENCE

(71) Applicant: Intuit Inc., Mountain View, CA (US)

(72) Inventors: Jay JieBing Yu, San Diego, CA (US); Matthew Sivertson, San Diego, CA (US); Gang Wang, San Diego, CA (US); Vinay Kumar, San Diego, CA (US); Jeffery Weber, San Diego, CA (US); Bojan Beran, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 822 days.

This patent is subject to a terminal disclaimer.

(21) Appl. No.: 16/527,703

(22) Filed: Jul. 31, 2019

(65) Prior Publication Data

US 2019/0355068 A1 Nov. 21, 2019

Related U.S. Application Data

(63) Continuation of application No. 14/555,486, filed on Nov. 26, 2014, now Pat. No. 10,417,717.

(51) Int. Cl.
*G06F 12/00* (2006.01)
*G06F 16/00* (2019.01)
(Continued)

(52) U.S. Cl.
CPC ....... *G06Q 40/123* (2013.12); *G06F 16/3329* (2019.01); *G06F 16/986* (2019.01); *G06F 40/14* (2020.01)

(58) Field of Classification Search
None
See application file for complete search history.

(56) References Cited

U.S. PATENT DOCUMENTS 6,754,668 B2 6/2004 Noble et al.
7,133,895 B1 11/2006 Lee et al.
(Continued)

FOREIGN PATENT DOCUMENTS

JP 2009217676 A 9/2009
KR 20090042018 A 4/2009

OTHER PUBLICATIONS

Laender, Conceptual Modeling, 19th International Conference on Conceptual Modeling, Oct. 9-12, 2000 (Yean 2000) (603 pages).
(Continued)

*Primary Examiner* — Tuan A Pham
(74) *Attorney, Agent, or Firm* — Ferguson Braswell Fraser Kubasta PC

(57) ABSTRACT

A method for providing user content that may receive, from a user device, a request for content. The method may obtain, in response to the request, a field identifier from a multiple of field identifiers according to a priority for a multiple of fields corresponding to the field identifiers. The field identifier may correspond to a field. The method may obtain application content based on the field identifier. The method may generate declarative content from the application content. The declarative content may express the application content in a declarative programming language. The method may transmit, to the user device, the declarative content.

17 Claims, 24 Drawing Sheets

(51) Int. Cl.
*G06Q 40/12* (2023.01)
*G06F 16/332* (2019.01)
*G06F 16/958* (2019.01)
*G06F 40/14* (2020.01)

(56) References Cited

U.S. PATENT DOCUMENTS

| | | |
|---|---|---|
| 7,149,776 B1 | 12/2006 | Roy et al. |
| 7,194,473 B1 | 3/2007 | Hichwa et al. |
| 7,712,023 B1 | 5/2010 | Bryan |
| 8,356,276 B2 | 1/2013 | Bender |
| 8,538,811 B2 | 9/2013 | Higgins et al. |
| 8,819,001 B1 | 8/2014 | Zhang |
| 8,924,269 B1 | 12/2014 | Seubert et al. |
| 8,930,253 B1 | 1/2015 | Ball |
| 2001/0011250 A1 | 8/2001 | Paltenghe et al. |
| 2002/0165880 A1 | 11/2002 | Hornsby et al. |
| 2003/0225829 A1 | 12/2003 | Pena et al. |
| 2004/0135807 A1 | 7/2004 | Pickering et al. |
| 2005/0114361 A1 | 5/2005 | Roberts et al. |
| 2006/0041546 A1 | 2/2006 | Ahn |
| 2006/0242124 A1* | 10/2006 | Fields ............. G06F 8/38 |
| 2007/0050778 A1 | 3/2007 | Lee et al. |
| 2007/0073683 A1 | 3/2007 | Kobayashi et al. |
| 2007/0078925 A1 | 4/2007 | Neil et al. |
| 2007/0162274 A1 | 7/2007 | Ruiz et al. |
| 2007/0238475 A1 | 10/2007 | Goedken |
| 2008/0097816 A1 | 4/2008 | Freire et al. |
| 2009/0042018 A1 | 2/2009 | Imholt et al. |
| 2009/0100425 A1 | 4/2009 | Russell |
| 2010/0317322 A1 | 12/2010 | Underwood et al. |
| 2011/0023016 A1 | 1/2011 | Khader et al. |
| 2011/0154305 A1 | 6/2011 | LeRoux et al. |
| 2011/0282714 A1* | 11/2011 | Cullen, III ......... G06Q 10/06 707/769 |
| 2012/0084185 A1 | 4/2012 | Ciaramitaro et al. |
| 2012/0109792 A1 | 5/2012 | Eftekhari et al. |
| 2012/0226708 A1 | 9/2012 | Srinivasa et al. |
| 2012/0323889 A1 | 12/2012 | Marum et al. |
| 2013/0117351 A1 | 5/2013 | Zoheir et al. |
| 2013/0159228 A1 | 6/2013 | Meijer et al. |
| 2013/0283305 A1 | 10/2013 | Hirsch et al. |
| 2014/0052608 A1 | 2/2014 | McDonald et al. |
| 2014/0067557 A1 | 3/2014 | van Niekerk et al. |
| 2014/0125672 A1 | 5/2014 | Winternitz et al. |
| 2014/0129397 A1 | 5/2014 | Lazerson |
| 2014/0136955 A1 | 5/2014 | Lee et al. |
| 2014/0201616 A1 | 7/2014 | Turner et al. |
| 2014/0229814 A1 | 8/2014 | Wright et al. |
| 2014/0229819 A1* | 8/2014 | Jewsbury ......... G06F 16/986 715/234 |
| 2014/0280515 A1 | 9/2014 | Wei et al. |
| 2014/0337070 A1 | 11/2014 | Cartwright et al. |
| 2015/0310052 A1 | 10/2015 | Konik et al. |
| 2016/0027107 A1 | 1/2016 | McDonald et al. |
| 2016/0078567 A1 | 3/2016 | Goldman et al. |
| 2016/0092994 A1 | 3/2016 | Roebuck et al. |
| 2016/0125451 A1 | 5/2016 | Garg et al. |

OTHER PUBLICATIONS

International Search Report and Written Opinion issued in related International application No. PCT/US2014/053168, dated Apr. 30, 2015 (11 pages).
International Search Report and Written Opinion in related International Application No. PCT/US2014/072553 dated Jun. 30, 2015 (8 pages).
International Search Report and Written Opinion in related International Application No. PCT/US2014/072535 dated Jul. 29, 2015 (11 pages).
International Search Report and Written Opinion in related International Application No. PCT/US2014/072559 dated Jul. 28, 2015 (8 pages).
International Search Report and Written Opinion issued in corresponding application No. PCT/US2014/072543 dated Jul. 29, 2015 (13 pages).
Anonymous: "Content of save.php", Oct. 16, 2013, Retrieved from the Internet on Apr. 9, 2018: URL: https://web.Archive.org/web/20131016124514/https://github .com/gitana/alpaca/archive/master.zip (1 page).
Extended European Search Report and Written Opinion issued in application No. EP14906982.5 dated Jun. 28, 2018 (10 pages).
Volker Turau, "Making legacy data accessible for XML applications"; Paper ID: 331; FH Wiesbaden, University of Applied Sciences, Department of Computer Science, Germany; Jan. 1, 1999 (11 pages).
Extended European Search Report in related European Patent Application No. 14879253.4 dated Apr. 23, 2018 (12 pages).
Gitana Software Inc., "Alpaca—HTML5 Forms for JQuery—Form Buttons", Jun. 5, 2014, Retrieved from the Internet on Apr. 9, 2018: URL:https://web.archive.org/web/20140605100521/http:l/alpacajs.org:80/examples/components/form-Controls/buttons.html (2 pages).
Gitana Software Inc., "Alpaca—Easy Forms for JQuery—Tools & Addons", Jun. 25, 2014, Retrieved from the Internet on Apr. 9, 2018: URL:https://web.archive.org/web/20140625105117/http:l/alpacajs.org/web/resources.html (1 page).
Anonymous: "Gitana/alpaca. GitHub Readme.md", Oct. 16, 2013, Retrieved from the Internet on Apr. 9, 2018: URL: https://web.archive.org/web/20131016124514/https://github .com/gitana/alpaca (4 pages).
Anonymous: "jQuery Mobile—Wikipedia", Aug. 6, 2014, Retrieved from the Internet on Apr. 10, 2018: URL: https://en. ,wikipedia.org/w/index.php?tille=jQuery_Mobile&oldid=620090108 (9 pages).
Extended European Search Report and Written Opinion issued in application No. EP14906803 dated May 7, 2018 (9 pages).
Office Action in related Canadian Application No. 2,966,388 dated Jun. 1, 2017 (6 pages).
Office Action issued in related U.S. Appl. No. 14/555,493 dated Oct. 6, 2016 (22 pages).
Notice of Allowance issued in related U.S. Appl. No. 14/555,493 dated Feb. 10, 2017 (10 pages).
Examination Report No. 2 issued in related Australian Application No. 2014377370 dated Feb. 28, 2017 (3 pages).
Office Action issued in related U.S. Appl. No. 14/463,415 dated May 9, 2016 (38 pages).
Office Action issued in related U.S. Appl. No. 14/463,415 dated Nov. 18, 2016 (34 pages).
International Search Report and Written Opinion issued in corresponding application No. PCT/US2014/072543 dated Jul. 29, 2015 (11 pages).

* cited by examiner

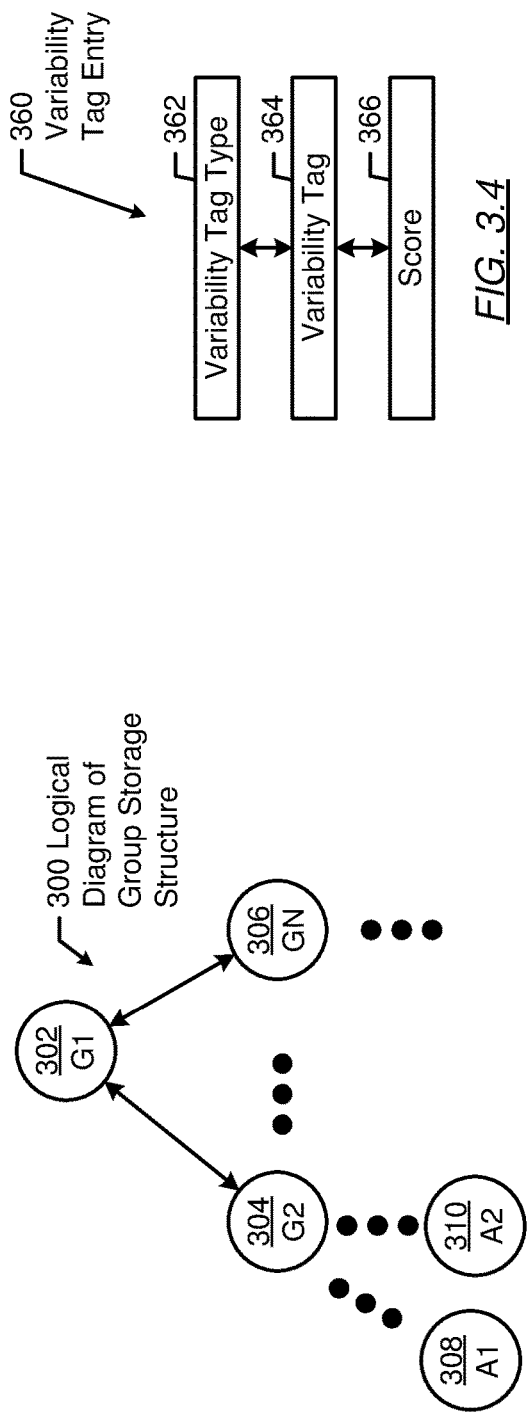
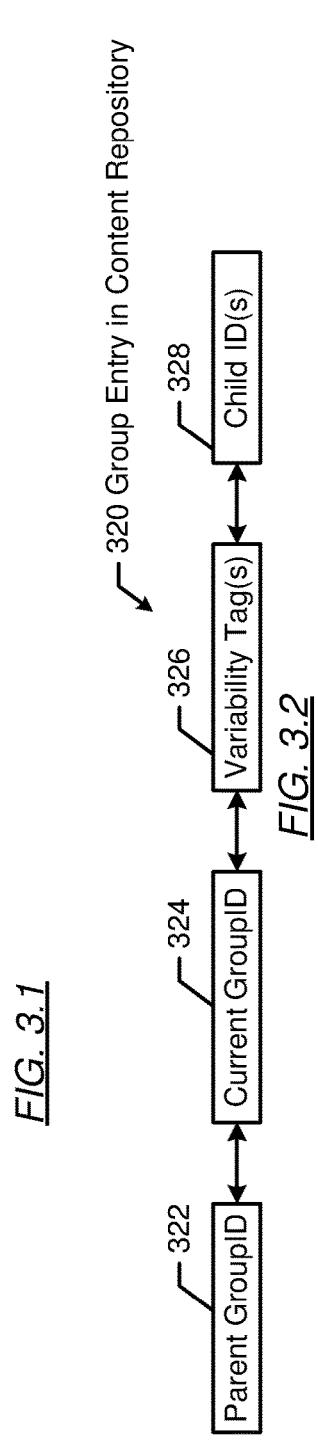

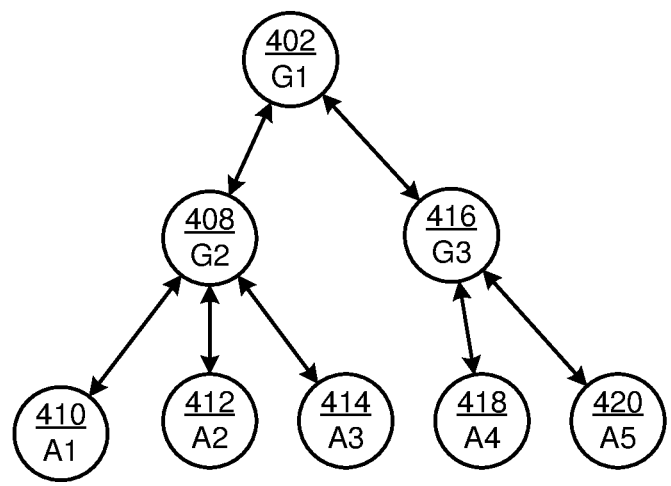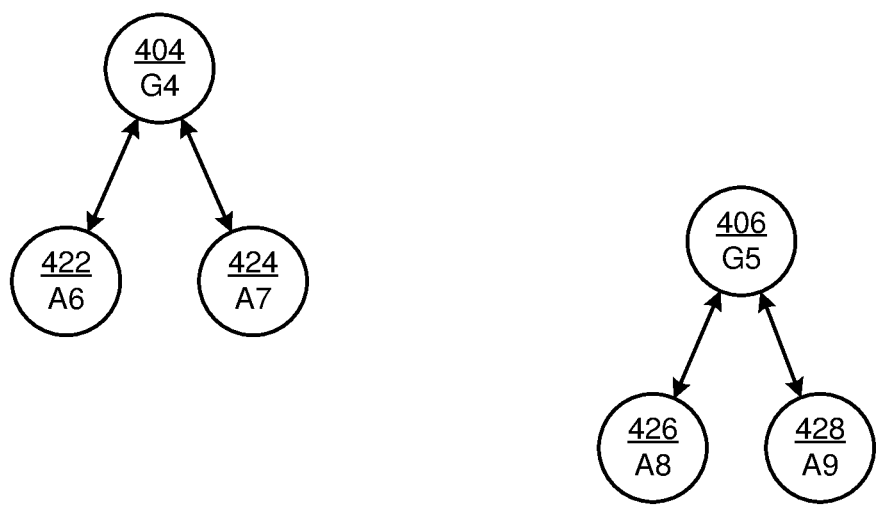
FIG. 4

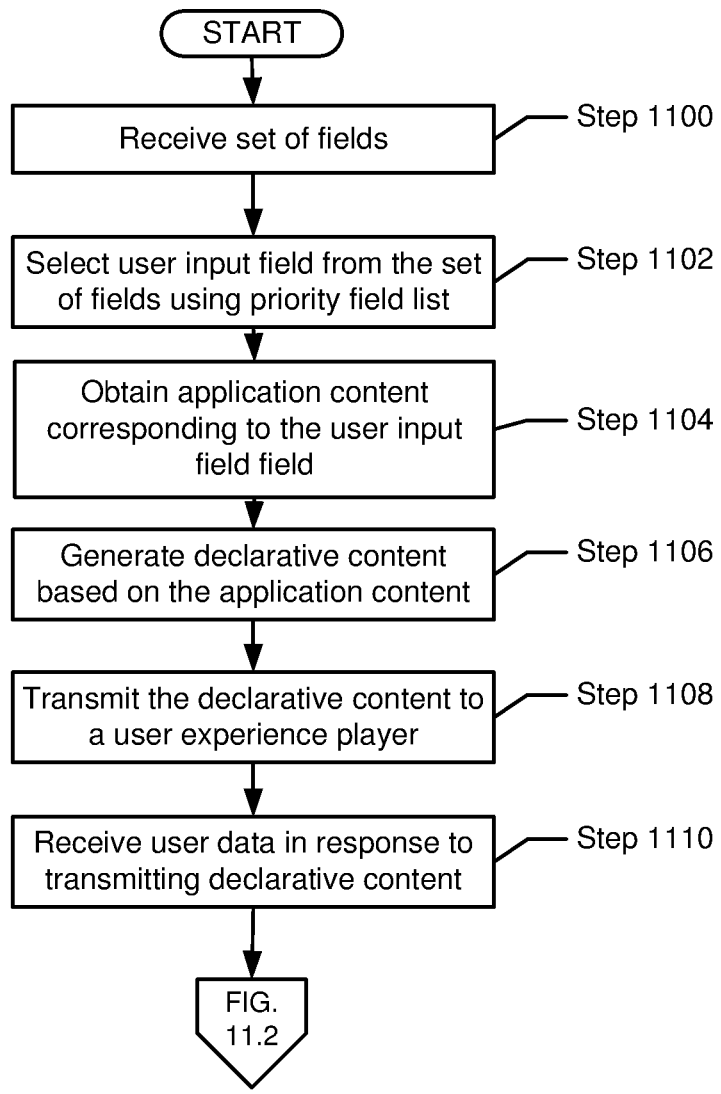
FIG. 11.1

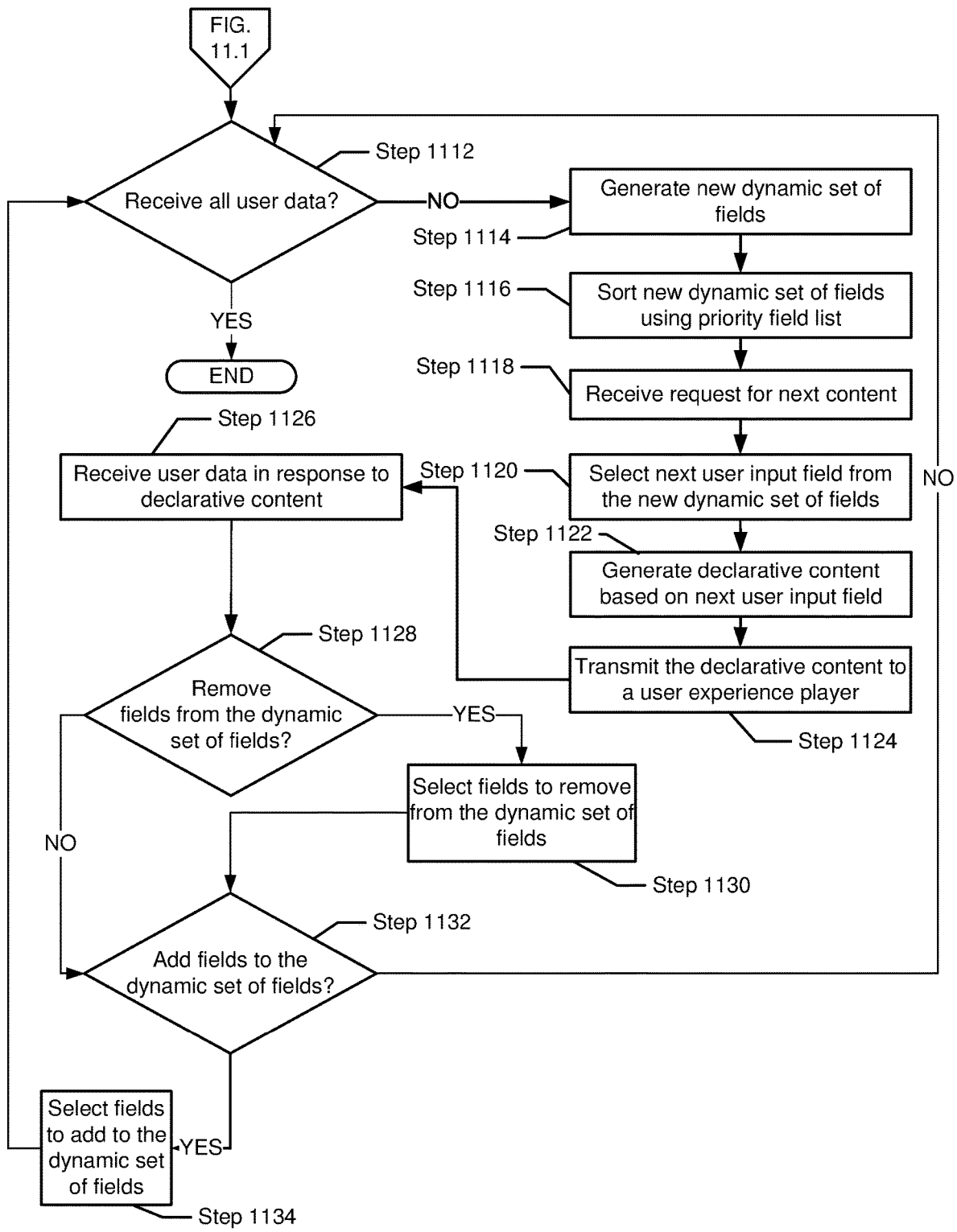
FIG. 11.2

TOPIC CONTEXT 1702

Federal Taxes

CATEGORY TITLE 1704

Unemployment (and Paid Family Leave)

EXPLANATION 1706

Unemployment and paid family leave benefits are both considered income and both sent to you on a Form 1099-G.

If you got a 1099-G for a state refund, don't enter that here. We'll ask about that later in Other Common Income.

PROMPT DESCRIPTION 1708

Did you receive unemployment or paid family leave benefits on a 1099-G in 2013?

AFFIRMATIVE DESCRIPTION 1712

○ Yes, we received unemployment or paid family leave on a 1099-G.

○ No, we didn't receive any of these payments on a 1099G.

NEGATIVE DESCRIPTION 1714

FIELD 1710

Continue — FORWARD NAVIGATION BUTTON 1716

Back — BACKWARD NAVIGATION BUTTON 1718

*FIG. 17*

1800 EXAMPLE

ASSET PROPERTY VALUES 1806 | VARIABILITY TAGS 1808 | ASSET CONTENT 1810

| ID 1804 | | | | | | |
|---|---|---|---|---|---|---|
| Id | Field | Type | Form | Lan | SKU | Description |
| UUID1 | Group001 | category | large | en | all | Unemployment (and Paid Family Leave) |
| UUID5 | Field001 | help | large | en | all | <p>Unemployment and paid family leave benefits are both considered income and both sent to you on a <b>Form 1099-G</b>.</p> <p>If you got a 1099-G for a state refund, don't enter that here. We will ask about that later in <b>Other Common Income</b>.</p> |
| UUID2 | Field001 | prompt | large | en | all | Did you receive unemployment or paid family leave benefits on a 1099-G in {{tax Year}}? |

ASSET PROPERTY VALUES 1816 | VARIABILITY TAGS 1818 | ASSET CONTENT 1820

| ID 1814 | | | | | | |
|---|---|---|---|---|---|---|
| Id | Field | Option | Form | Lan | SKU | Description |
| UUID3 | Field001 | true | large | en | all | <b>Yes</b>, we received unemployment or paid family leave on a 1099-G. |
| UUID4 | Field001 | false | large | en | all | <b>No</b>, we didn't receive any of those payments on a 1099-G. |

1822 EXAMPLE

| Parent | Child | Topic |
|---|---|---|
| Group001 | Field001 | FederalTax/WagesIncome/1099G |

*FIG. 18*

2002 Priority Field List

2004 Field 1: Do You Have Insurance? (User Input Field)

2008 Field 2: Are you SURE you've got insurance? (User Input Field)

2010 Field 3: Great! You've Got No Penalty! (User Experience Field)

2012 Field 4: Sorry, You've Got a Penalty. Let's see if you qualify for an exemption (User Experience Field)

2014 Field 5: Do You Have a 1095A? (User Input Field)

2016 Field 6: Can you claim to be a member of an Indian Tribe? (User Input Field)

2018 Field 7: Conclusion (User Experience Field)

*FIG. 20.1*

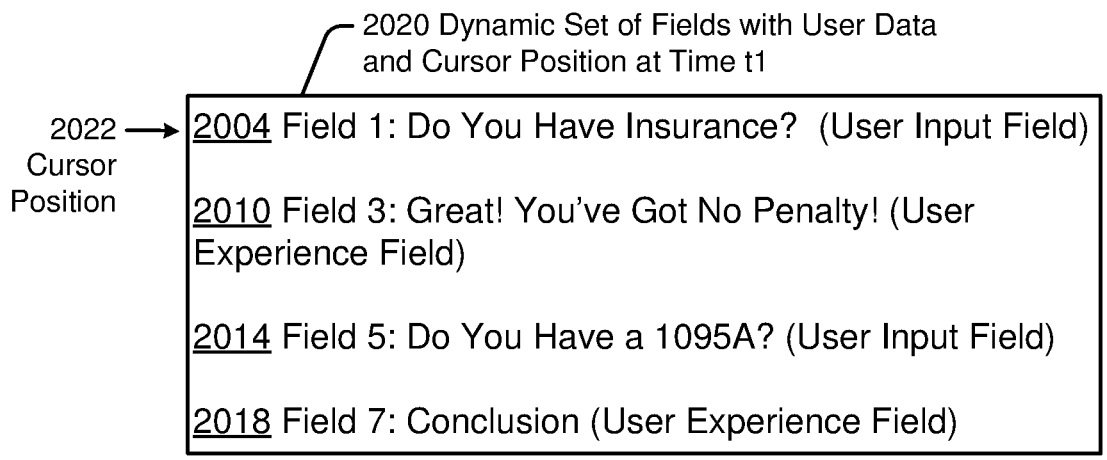
FIG. 20.2
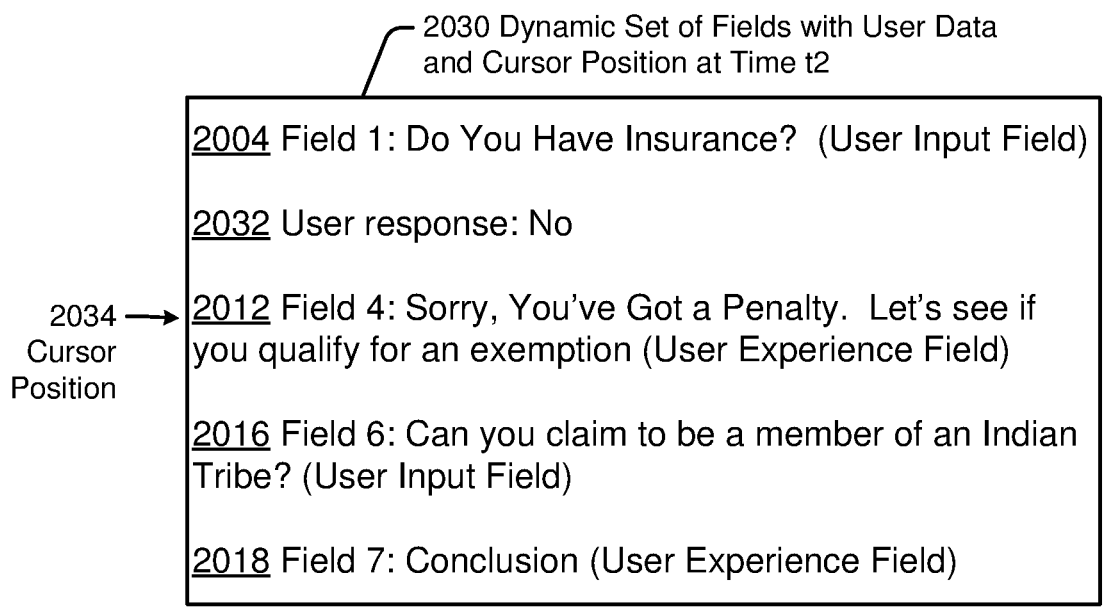
FIG. 20.3

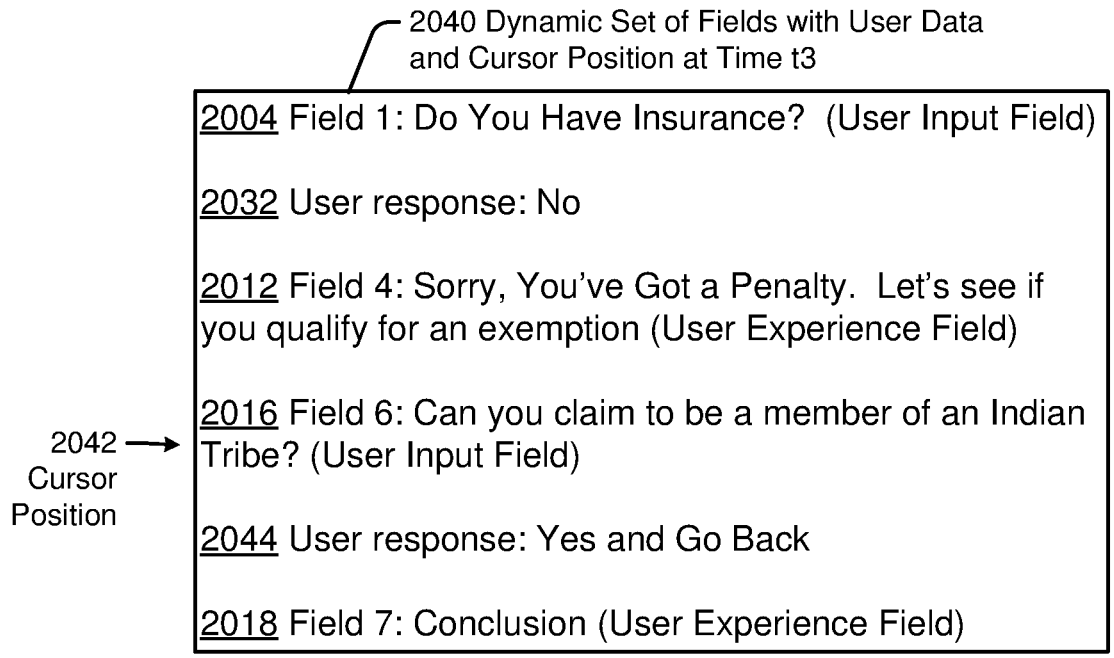
FIG. 20.4
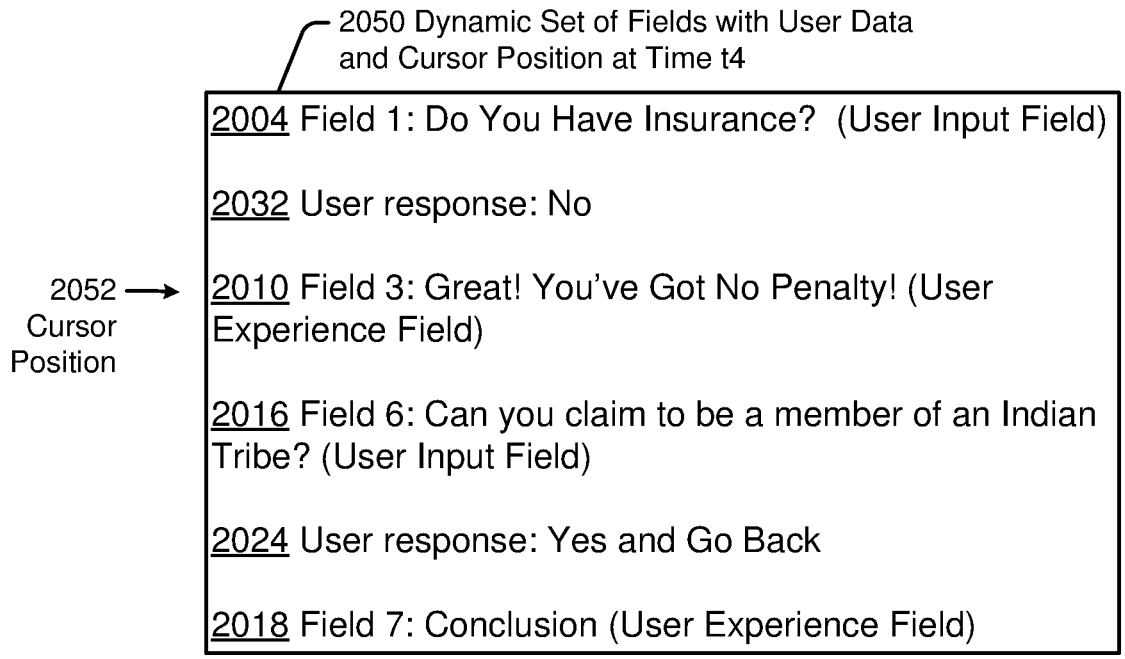
FIG. 20.5

METHOD AND SYSTEM FOR GENERATING DYNAMIC USER EXPERIENCE

CROSS-REFERENCE TO RELATED APPLICATIONS

This application is a continuation of, and therefore claims benefit under 35 U.S.C. § 120 to, U.S. application Ser. No. 14/555,486 filed on Nov. 26, 2014. U.S. application Ser. No. 14/555,486 is incorporated herein by reference in its entirety.

This application includes subject matter related to U.S. patent application Ser. No. 14/463,415, entitled "Common Declarative Representation of Application Content and User Interaction Content Processed by a User Experience Player", filed Aug. 19, 2014, which is incorporated herein by reference in its entirety. This application further includes subject matter related to: (i) U.S. patent application Ser. No. 14/555,505, entitled "Method and System for Storage Retrieval", and having inventors Jay JieBing Yu, Matthew Sivertson and Vinay Kumar; (ii) U.S. patent application Ser. No. 14/555,499, entitled "Method and System for Organized User Experience Workflow", and having inventors Matthew Sivertson, Gang Wang, Kevin McCluskey, Vinay Kumar, and Jay JieBing Yu; and (iii) U.S. patent application Ser. No. 14/555,493, entitled "Dynamic User Experience Workflow", and having inventors Matthew Sivertson, Gang Wang, Kevin McCluskey, Vinay Kumar, and Jay JieBing Yu, which are all filed on the same day as the present application and all incorporated herein by reference in their entirety.

BACKGROUND

Currently, a great variety of computing device platforms exists. Generally, each type of computing device platform includes platform-specific hardware with varied capabilities, as well as an optional operating system environment in which computer applications may function. A computer application is often designed to work within the construct of an operating system and to work with the operating system to take advantage of at least some aspects of the platform hardware. To this end, computer applications must often be re-designed, at least in part, to be able to function as desired with each of the various operating systems and the platform hardware combinations. In such scenarios, each version of a computer application may require maintaining a separate application code base and separate accompanying programming effort for each environment in which a software vendor wants a computer application to function. The difficulty of such a task increases if the software vendor desires to create a different and/or unique user experience for different platforms on which a computer application is to execute. Alternatively, a software vendor may instead choose to only create one version of an application. The single version of the application may be intended to be deployed along with an execution environment (e.g., web browser, virtual machine, etc.) that is capable of interacting with the underlying operating system and/or platform hardware. In such scenarios, the computer application may not be capable of taking advantage of platform hardware capabilities due to the additional layer of abstraction (i.e., the execution environment) existing between the computer application and the underlying hardware.

SUMMARY

In general, in one aspect, embodiments relate to a method for providing user content including receiving, from a user device, a request for content, and obtaining, in response to the request, a field identifier from a multiple of field identifiers according to a priority for a multiple of fields corresponding to the field identifiers. The field identifier may correspond to a field. The method further includes obtaining application content based on the field identifier, and generating declarative content from the application content. The declarative content may express the application content in a declarative programming language. The method further includes transmitting, to the user device, the declarative content.

In general, in one aspect, embodiments relate to a system for providing user content including a computer processor, a memory, and a declarative content engine executing on the computer processor and configured to receive, from a user device, a request for content, and obtain, in response to the request, a field identifier from a multiple of field identifiers according to a priority for a multiple of fields corresponding to the field identifiers. The field identifier may correspond to a field. The declarative content engine is further configured to obtain application content based on the field identifier, and generate declarative content from the application content. The declarative content may express the application content in a declarative programming language. The declarative content engine is further configured to transmit, to the user device, the declarative content.

In general, in one aspect, embodiments relate to a non-transitory computer readable medium for providing user content including computer readable program code for receiving, from a user device, a request for content, and obtaining, in response to the request, a field identifier from a multiple of field identifiers according to a priority for a multiple of fields corresponding to the field identifiers. The field identifier may correspond to a field. The computer readable program code is further for obtaining application content based on the field identifier, and generating declarative content from the application content. The declarative content may express the application content in a declarative programming language. The computer readable program code is further for transmitting, to the user device, the declarative content.

Other aspects of the invention will be apparent from the following description and the appended claims.

BRIEF DESCRIPTION OF DRAWINGS

FIGS. 3.1, 3.2, 3.3, and 3.4 show logical storage diagrams of the content repository in accordance with one or more embodiments of the invention.

FIG. 4 shows an example relational diagram of assets and groups in accordance with one or more embodiments of the invention.

FIGS. 9, 10, 11.1, 11.2, 12, 13, 14, 15, and 16 show flowcharts in accordance with one or more embodiments of the invention.

FIGS. 17, 18, 19, 20.1, 20.2, 20.3, 20.4, and 20.5 show examples in accordance with one or more embodiments of the invention.

DETAILED DESCRIPTION

Figure 1:
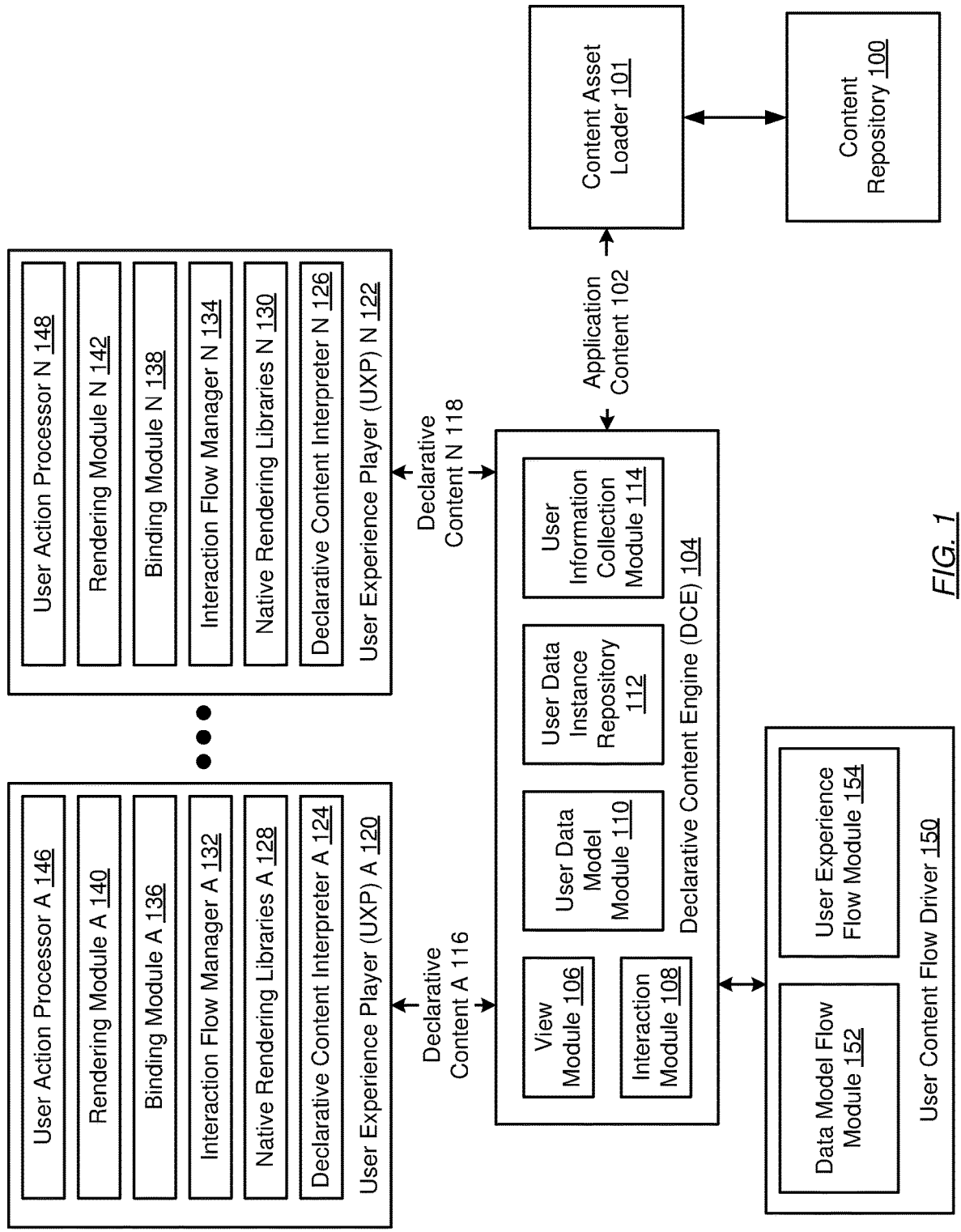
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for providing an application workflow using declarative content. Specifically, a set of fields may be generated for the application workflow, whereby the set of fields may include user input fields to a data model and user experience fields for determining which content is displayed to a user. From the user input fields and the user experience fields, the highest priority field may be selected. A request with a field identifier corresponding to the selected highest priority field may be sent to a content asset loader. In response, the content asset loader may provide application content having assets based on the field identifier and variability tags for a user experience player. Declarative content may be generated based on the application content, and the declarative content may be sent to a user experience player.

In one or more embodiments of the invention, the application content is represented, to a client device, using a declarative content expression that is common between various types of platforms on which an application may execute. In one or more embodiments of the invention, a declarative content engine includes functionality to request application content, express the application content as at least a portion of declarative content, and transmit the declarative content to any of a variety of computing device types, each of which may include an execution environment such as an operating system.

A computing device combined with execution environment may be referred to as a platform. In one or more embodiments of the invention, each platform type on which an application may execute has a user experience player designed for the platform that is capable of, at least, interpreting the declarative content to obtain the application content. In such embodiments of the invention, the user experience player may include functionality to bind the application content to one or more templates and navigation patterns that are native to the platform type on which the user experience player is executing. The application content may then be displayed by the user experience player to a user of the application. In one or more embodiments of the invention, the user of the application takes actions based on being presented the application content, and the user experience player includes functionality to represent the received user actions as declarative content which may be returned to the declarative content engine.

FIG. 1 shows a system in accordance with one or more embodiments of the invention. In one or more embodiments of the invention, the system includes a content repository (e.g., content repository (100)) and a content asset loader (e.g., content asset loader (101)) from which application content (e.g., application content (102)) may be obtained. In one or more embodiments of the invention, the system includes a user content flow driver (UCFD) (e.g., UCFD (150)).

The user content flow driver corresponds to hardware, software, firmware, or a combination thereof that includes functionality to manage an application workflow for a declarative content engine. For example, the application workflow may describe a dynamic order that includes at least a subset of fields which are presented to a user. Fields are discrete requests or presentations of data. The type of fields may include user input fields and user experience fields. Specifically, a user input field may correspond to a data request to a user that is presented during the execution of an application. In other words, a user input field is a field presented to a user to receive a particular item of data used to perform a function of the application. User experience fields may be directed to particular application content displayed to a user during the execution of the application. As such, the user experience fields may relate to a user's experience during the execution of the application without including a direct information request from the user. In other words, user experience fields may be used for informational purposes.

The UCFD (150) may include a data model flow module (152) and a user experience flow module (154). The data model flow module (152) includes functionality to receive user data, and select relevant and incomplete fields based on the user data. In one or more embodiments of the invention, a data model flow module (152) is any software, hardware, firmware, and/or combination thereof capable of determining and/or requesting one or more user input fields to obtain a particular result based on a data model. As such, the user input fields may correspond to data submitted by a user and used by the data model flow module (152) to calculate the particular result from the submitted data. Specifically, the data model may be a tax model for calculating an amount of tax owed by a person or entity, a lending model regarding whether to approve or deny a loan for a particular person or entity, or a financial transaction model for determining one or more aspects of a financial transaction (e.g., whether to approve the financial transaction, individual costs regarding the financial transaction, etc.).

The data model flow module (152) may further include functionality to select relevant and complete fields. A relevant field is a field that is germane to the user and may take into account previously provided data. For example, if user data indicates that a user has a home office, then fields for answering questions about the home office are relevant. In another example, if user data indicates that a user is not married, then fields for answering questions about the user's spouse, such as the spouse's name, is not relevant.

In one or more embodiments of the invention, the UCFD (150) includes a user experience flow module (154). In one or more embodiments of the invention, a user experience flow module (154) is any software, hardware, firmware, and/or combination thereof capable of determining one or more user experience fields for inclusion into an application workflow for a user. Specifically, user experience fields may include individual pages and/or portions of pages that may correspond to application content displayed to a user during the operation of the application workflow.

In one or more embodiments of the invention, the system also includes a declarative content engine (DCE) (e.g., DCE 104) and one or more user experience players (UXPs) (e.g., UXP A (120), UXP N (122)). The DCE (104) may include a view module (e.g., view module (106)), an interaction module (e.g., interaction module (108)), a user data model module (e.g., user data model module (110)), a user data instance repository (e.g., user data instance repository 112), and a user information collection module (e.g., user information collection module (114)). Each UXP (e.g., UXP A (120), UXP N (122)) may include: (i) a declarative content interpreter (e.g., declarative content interpreter A (124), declarative content interpreter N (126)); (ii) one or more native rendering libraries (native rendering library A (128), native rendering library N (130)), (iii) an interaction flow manager (e.g., interaction flow manager A (132), interaction flow manager N (134)), (iv) a binding module (e.g., binding module A (136), binding module N (138)); (v) a rendering module (e.g., rendering module A (140), rendering module N (142)); and (vi) a user action processor (e.g. user action processor A (146), user action processor N (148)). Each of these components is described below.

In one or more embodiments of the invention, the content repository (100) is a data repository. In one or more embodiments of the invention, the content repository (100) is any type of storage unit and/or device (e.g., a file system, database, collection of tables, or any other storage mechanism) for storing data/information. Specifically, the content repository (100) may include hardware and/or software. Further, the content repository (100) may include multiple different storage units and/or devices. The multiple different storage units and/or devices may or may not be of the same type or located at the same physical site. In one or more embodiments of the invention, the content repository (100) is included as a part of the DCE (104). In other embodiments of the invention, the content repository (100) is a stand-alone repository that is operatively connected to and accessed, at least, by the DCE (104). In one or more embodiments of the invention, the content repository (100) includes functionality to store, at least in part, application content (e.g., application content (102)). Further, the content repository (100) includes functionality to provide, at least indirectly, the application content (102) to at least one DCE (104).

Application content may be content of an application that is executed by a user. Application content (102) may include, but is not limited to, data related to what an end-user of the application may see, data related to the functioning of the application, data related to the flow of an application (e.g., what application content should be presented next based on user feedback such as an answer to a question), metadata (e.g., type information related to data objects included with the application content), and any other type of data that may be used during execution of an application. For example, application content (102) may inform the experience that is presented to the user.

In at least some embodiments of the invention, application content is text that is displayable in an application. In such embodiments of the invention, application content may exclude any description of the alignment of the text that is displayed or how the application is executed. In some embodiments, the application content does not include formatting information, rather, the application content is raw text and the function of the text within the application. In other embodiments, the application content is limited to the formatting of font of the text (e.g., bold, italic, font type, etc.) and the paragraph breaks in a multi-paragraph explanation without specifying the alignment of the text in the application. In yet other embodiments of the invention, the application content may include additional formatting. For example, the application content may include, but is not limited to, application data for a tax preparation application, a financial transaction application, and/or a loan request application. In the example, application content may include questions, answer choices, relevant information, help, menu options, titles, and other text that is displayable on a page. In one or more embodiments of the invention, application content is partitioned into assets. Application content and assets are discussed in further detail below and in FIG. 2.

In one or more embodiments of the invention, the DCE (104) is a software application written in any programming language that includes instructions stored in any non-transitory computer readable medium which, when executed by one or more processors in a computing device, enable the computing device to perform the functions described in accordance with one or more embodiments of the invention. In one or more embodiments of the invention, the DCE (104) includes functionality to express application content as declarative content using a declarative programming language (e.g., JavaScript Object Notation (JSON)). In one or more embodiments of the invention, the DCE (104) includes functionality to, at least in part, transmit declarative content to one or more operatively connected (e.g., via computer network (not shown)) UXPs (e.g., UXP A (120), UXP N (122)).

In one or more embodiments of the invention, the DCE (104) includes a view module (106). In one or more embodiments of the invention, a view module (106) is any software, hardware, firmware, and/or combination thereof capable of obtaining view information from the application content and expressing the view information in a declarative programming language. The DCE (104) may also include functionality to interpret view information expressed as declarative content that is received by the DCE (104). View information (not shown) may include information necessary for a logical unit (i.e., a view unit) of presentation but without certain details (e.g., layout, visual control) necessary to render the information. Examples of view information include, but are not limited to, user visible text, data bindings, user action possibilities, hierarchical groupings of artifacts, and semantic relationships between artifacts.

In one or more embodiments of the invention, the DCE (104) includes an interaction module (108). In one or more embodiments of the invention, an interaction module (108) is any software, hardware, firmware, and/or combination thereof capable of obtaining interaction flow and logic information (not shown), and expressing the interaction flow and logic information in a declarative programming language as declarative content. In one or more embodiments of the invention, the interaction module also includes functionality to interpret interaction flow and logic information expressed as declarative content that is received by the DCE (104). Interaction flow and logic information may specify navigation logic, which may be used to determine the next unit of information (e.g., a next view unit) to present to a user of an application upon receiving user actions in response to a current application view (i.e., a current view unit). In one or more embodiments of the invention, the interaction module includes a state machine that is used to model the interaction flow of an application, with nodes representing the view unit, edges representing transitions, and with additional attachments for specifying conditions associated with each transition.

In one or more embodiments of the invention, the DCE (104) includes a user data model module (110). In one or more embodiments of the invention, a user data model module (110) is any software, hardware, firmware, or combination thereof capable of obtaining user data model information (not shown) and expressing the user data model information in a declarative programming language. In one or more embodiments of the invention, the user data model module (110) also includes functionality to interpret user data model information expressed as declarative content that is received by the DCE (104). User data model information may specify the data definition for visible data in a given view unit. In one or more embodiments of the invention, user data model information also includes field and/or type information, which may allow a UXP (e.g., UXP A 120) to perform error checks on information entered by a user of an application. In one or more embodiments of the invention, the user data model module (110) may include functionality to use a declarative programming language to express definitions for fields of a view unit. In such an embodiment, the expression of the user data model information includes, but is not limited to, an enumeration field that includes all possible enumerated values for a field, the type of the possible values, and validation logic. Such information may allow a UXP to perform various error checks on user actions.

In one or more embodiments of the invention, the DCE (104) includes a user data instance repository (112). In one or more embodiments of the invention, a user data instance repository includes a data repository, similar to the data repository described above, that includes the actual value of user data obtained during a user's use of an application. The user data instance repository (112) may include any software, hardware, firmware, and/or combination thereof capable of obtaining and/or storing user data instances as well as both expressing and, in some cases, receiving the user data instances in a declarative programming language (e.g., JSON). In one or more embodiments of the invention, the user data instance repository (112) includes functionality to express user data instances as declarative content which the DCE (104) may transmit to a UXP (e.g., UXP A 120), allowing the UXP to maintain an in-memory client-side data store for managing user data instances as needed for the execution of the application. In one or more embodiments of the invention, the user data instance repository (112) also includes functionality to interpret data instances expressed as declarative content that are received by the DCE (104).

In one or more embodiments of the invention, the DCE (104) includes a user information collection module (114). In one or more embodiments of the invention, a user information collection module (114) is any software, hardware, firmware, and/or combination thereof capable of obtaining user information (not shown) and expressing the user information in a declarative programming language. In one or more embodiments of the invention, the user information collection module (114) also includes functionality to interpret user information expressed as declarative content that is received by the DCE (104). User information may include information related to a given user. User information may also include information related to one or more platforms on which a user executes an application. The user information collection module (114) may include functionality to maintain (e.g., store) user information for one or more users of one or more applications. User information may include user-specific information such as profession, age, demographics, user emotional state, complexity of specific user scenario, any other information associated with a user, and/or any combination thereof. User information may also include device information such as platform type (e.g., mobile device, web browser, desktop computer, etc.), operating system type (e.g., iOS, Android, Windows, etc.), and/or device capabilities (e.g., camera, sensors, location awareness, text capabilities, audio capabilities, etc.). In one or more embodiments of the invention, the user information collection module (114) includes functionality to modify the application content requested by the DCE (104) and/or the declarative content provided to a UXP in order to modify the user experience based on the user information. For example, the user experience may be modified by changing the type of information, descriptions of questions, brevity of explanations, available modes of input, etc.

In one or more embodiments of the invention, the DCE (104) transmits declarative content (e.g., declarative content A (116), declarative content N (118)) to one or more UXPs (e.g., UXP A (120), UXP N (122)). In one or more embodiments of the invention, declarative content is content expressed in a declarative programming language. A declarative programming language may generally be used to express the logic of a computation without describing its control flow. Examples of a declarative programming language include, but are not limited to, JSON, structured query language (SQL), Prolog, and Datalog. In one or more embodiments of the invention, declarative content includes application content as well as various other types of information (e.g., interaction flow and logic information) necessary to allow a UXP to render the application content for a user (not shown). In one or more embodiments of the invention, the declarative content includes information expressed in a declarative programming language that is obtained by one or more of the modules and/or repositories included with and/or operatively connected to the DCE (104). Declarative content also includes information expressed in a declarative programming language that is transmitted from a UXP (e.g., UXP A (120), UXP N (122)) to the DCE (104), which may, for example, include information related to user actions and user related information.

In one or more embodiments of the invention, the DCE (104) is operatively connected to one or more UXPs (e.g., UXP A (120), UXP N (122)). The DCE may be operatively connected to the one or more UXPs via a computer network (not shown) such as the Internet. The DCE (104) and the one or more UXPs may be designed to communicate via information expressed in a declarative programming language. In one or more embodiments of the invention, a UXP (e.g., UXP A (120), UXP N (122)) is any software, hardware, firmware, or combination thereof capable of processing declarative content received from a DCE (104), presenting (i.e., rendering) application content to a user, receiving user actions, and transmitting user actions expressed in a declarative programming language to the DCE (104). Interactions between the user of an application and the UXP may occur, at least in part, visually and/or non-visually. Examples of non-visual modes of interaction include, but are not limited to, audio, motion, touch, and electromagnetic. Both the UXP and the user may interact with the other in any of the aforementioned interaction methods. For example, the user may speak words that the UXP processes while the UXP presents information to the user visually. For another example, the UXP may present application content to the user via audio communication while the user communicates with the UXP via eye movement.

In one or more embodiments of the invention, a UXP (e.g., UXP A (120), UXP N (122)) is at least part of a software application written in any programming language that includes instructions stored in any non-transitory computer readable medium which, when executed by one or more processors in a computing device, enable the computing device to perform the functions described in accordance with one or more embodiments of the invention. In one or more embodiments of the invention, a UXP (e.g., UXP A (120), UXP N (122)) is a user interface (UI) module. In one or more embodiments of the invention, the UXP is a part of the application that a user is executing. In other embodiments of the invention, the UXP is a separate module capable of performing actions on behalf of and/or in conjunction with the application that a user is executing.

A UXP (e.g., UXP A (120), UXP N (122)) may be a computer program, or a portion thereof, designed to execute on a certain platform type or group of platform types. For example, a UXP may be designed to execute on a specific device type (e.g., smart phone) on which a specific operating system type (e.g., Android) executes. For another example, a UXP may be designed to execute on any desktop and/or laptop computer that is executing one of a range of Windows-based operating systems (i.e., a Windows based platform type). In one or more embodiments of the invention, the UXP (e.g., UXP A (120), UXP N (122)) executes on any type of computing device, substantially similar to the computing devices described above in relation to the DCE (104). The UXP (e.g., UXP A (120), UXP N (122)) may include functionality to present application content to a user visually (e.g., presenting a graphical user interface (GUI)). In one or more embodiments of the invention, the UXP (e.g., UXP A (120), UXP N (122)) includes functionality to present application content in any non-visual way that is supported by the platform on which the UXP executes. For example, the UXP may include functionality to render application content in ways including, but not limited to, via audio, via a text-based interface (e.g., short message service (SMS) text), via braille, and/or via a virtual reality based interface.

In one or more embodiments of the invention, the UXP (e.g., UXP A (120), UXP (122)) includes a declarative content interpreter (e.g., declarative content interpreter A (124), declarative content interpreter N (126)). In one or more embodiments of the invention, a declarative content interpreter (e.g., declarative content interpreter A (124), declarative content interpreter N (126)) is any software, hardware, firmware, and/or combination thereof capable of interpreting (i.e., processing) declarative content received from a DCE (104) in order to obtain application content and related information (e.g., interaction flow and logic information, user data model information, etc.), which may be referred to as interpreted content. In one or more embodiments of the invention, the declarative content interpreter (e.g., declarative content interpreter A (124), declarative content interpreter N (126)) also includes functionality to express information (e.g., information related to a user's actions) in a declarative programming language before it is transmitted to the DCE (104). In one or more embodiments of the invention, the declarative content interpreter is a module that is common amongst all UXPs, or a portion thereof, meaning that the various UXPs all include a common portion that is the declarative content interpreter. In other embodiments of the invention, the declarative content interpreter may differ between two or more UXPs.

The UXP (e.g., UXP A (120), UXP N (122)) may further include one or more native rendering libraries (e.g., native rendering libraries A (128), native rendering libraries N (130)). As used in this context, a library is a collection of information, behaviors, and/or subroutines with defined interfaces that may be used by any appropriately configured software executing on a platform that includes the library. In one or more embodiments of the invention, a native rendering library (e.g., native rendering libraries A (128), native rendering libraries N (130)) is a library in which exists information that allows the UXP (e.g., UXP A (120), UXP N (122)) to render application content on a specific platform on which the UXP and user executed application are executing. For example, a native platform library may include one or more native templates specific to the operating system, web browser, and/or computing device hardware on which the UXP executes. In such an example, the one or more templates may include, but are not limited to, information related to visual and/or non-visual presentation of information as well as navigation patterns and actuators (e.g., buttons to press, drop down lists for selecting from, defined meanings for user swipe actions, etc.). In one or more embodiments of the invention, more than one native library, each including differing native templates and navigation patterns, allows the UXP to render an application differently to a user on the same platform.

In one or more embodiments of the invention, the UXP (e.g., UXP A (120), UXP N (122)) includes an interaction flow manager (e.g., interaction flow manager A (132), interaction flow manager N (134)). In one or more embodiments of the invention, an interaction flow manager (e.g., interaction flow manager A (132), interaction flow manager N (134)) is any software, hardware, firmware, and/or combination thereof capable of executing various aspects of a user's interaction with an application based, at least in part, on the received interaction flow and logic information and various user actions.

In one or more embodiments of the invention, the UXP (e.g., UXP A (120), UXP N (122)) includes a binding module (e.g., binding module A (136), binding module N (138)). In one or more embodiments of the invention, a binding module (e.g., binding module A (136), binding module N (138)) is any software, hardware, firmware, and/or combination thereof capable of binding platform-native visual and/or non-visual templates and navigation patterns (i.e., of the aforementioned one or more native rendering libraries) with the declarative content (including application content therein) to be presented to a user as a view unit.

In one or more embodiments of the invention, the UXP (e.g., UXP A (120), UXP N (122)) includes a rendering module (e.g., rendering module A (140), rendering module N (142)). In one or more embodiments of the invention, a rendering module (e.g., rendering module A (140), rendering module N (142)) is any software, hardware, firmware, and/or combination thereof capable of rendering the view unit bound by the binding module (e.g., binding module A (136), binding module N (138)) to a user of an application. The rendering may include visual aspects, non-visual aspects, or a combination thereof.

In one or more embodiments of the invention, the UXP (e.g., UXP A (120), UXP N (122)) includes a user action processor (e.g., user action processor A (146), user action processor N (148)). In one or more embodiments of the invention, a user action processor (e.g., user action processor A (146), user action processor N (148)) is any software, hardware, firmware, and/or combination thereof capable of, at least, handling user actions, updating one or more local data stores, and performing view unit refresh actions.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, there may be more than one declarative content engine. For another example, there may be any number of user experience players operatively connected to each declarative content engine. Accordingly, embodiments of the invention should not be considered limited to the specific arrangements of modules and elements shown in FIG. 1.

By way of another example, all or portions of the user content flow driver may be a part of the declarative content engine. By way of a more specific example, the data model flow module and/or user experience flow module may be separate from the user content flow driver, which is located on the declarative content engine. Other configurations of the data model flow module, user experience flow module, user content flow driver, and declarative content engine may exist without departing from the scope of the invention.

Figure 2:
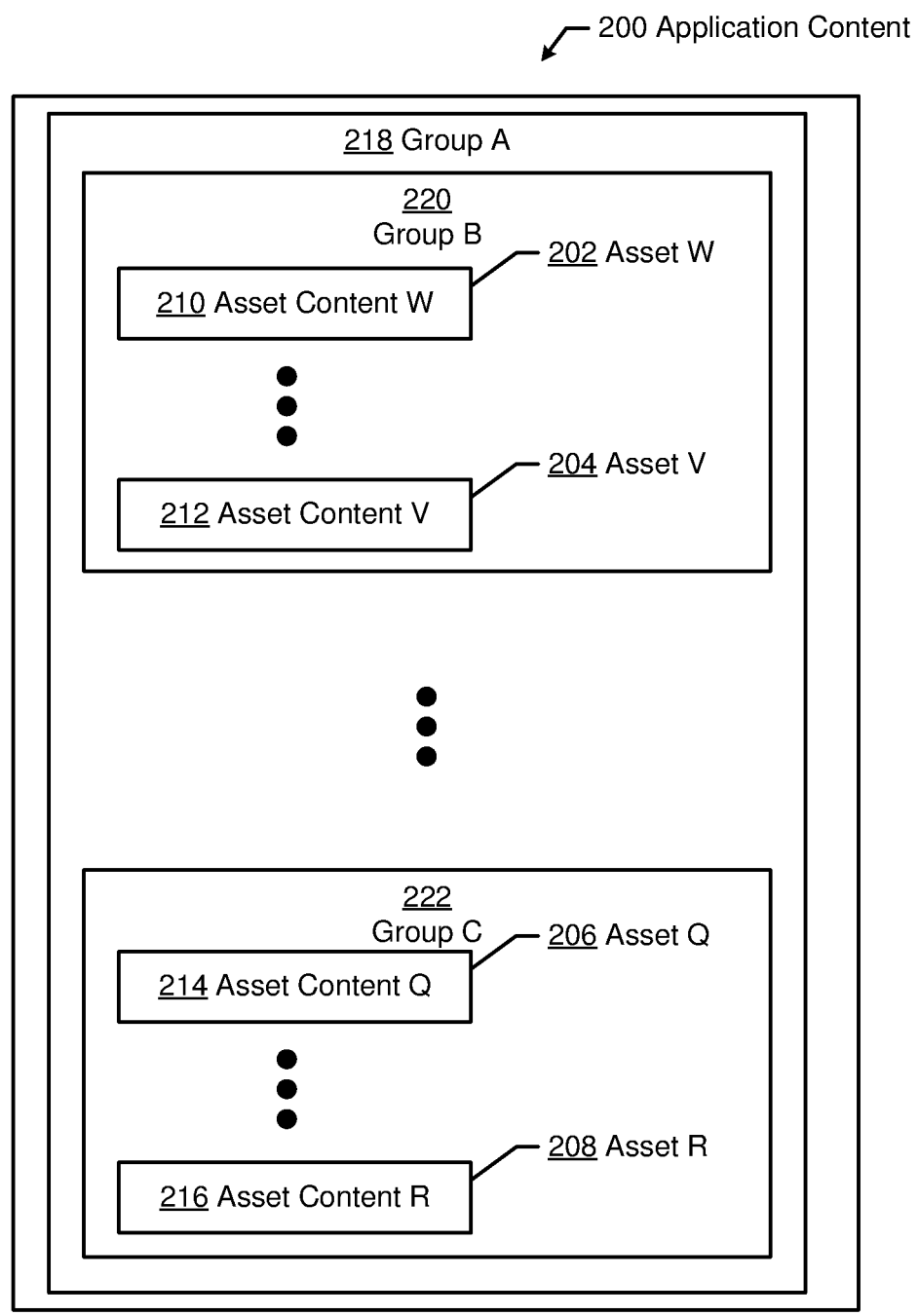
FIG. 2 shows an example diagram of application content in accordance with one or more embodiments of the invention.

FIG. 2 shows an example diagram of application content (200) in accordance with one or more embodiments of the invention. As discussed above, application content (200) may correspond to the displayed portions of an application and the function of the displayed portions with respect to the display. As shown in FIG. 2, application content (200) may be partitioned into assets (e.g., asset W (202), asset V (204), asset Q (206), asset R (208)). An asset (e.g., asset W (202), asset V (204), asset Q (206), asset R (208)) is a discrete portion of application content. In one or more embodiments of the invention, assets are indivisible. In other words, assets are not capable of being divided and retain meaning within the context of the application.

Each asset may include asset content (e.g., asset content W (210), asset content V (212), asset content Q (214), asset content R (216)). Asset content is the displayed portion of the asset. In particular, asset content may be text, image(s), or other displayed portion. For example, an asset may be for a title, a help, a prompt, an explanation of a field, or other discrete portion of application content. In the example, the asset content is the text of the title, the text prompting the user, and the explanation text.

Assets (e.g., asset W (202), asset V (204), asset Q (206), asset R (208)) may be grouped into groups (e.g., group A (218), group B (220), group C (222)). Similarly, groups may be hierarchically grouped. The grouping may be based on assets belonging to the same field, a logical grouping between fields, and a grouping between groups. As shown in the example, group A (218) includes group B (220) and group C (222). Group B (220) includes asset W (202) and asset V (204), which each includes asset content. Group C (222) includes asset Q (206) and asset R (208). The number of assets in a group as well as the amount of grouping may be variable between groups and may be configurable. In one or more embodiments of the invention, group A (218) is a root group. A root group is the group that includes all other groups in the application content and that is provided in response to a request. In particular, when a request is received, the root group is provided to the DCE as the application content. For example, a root group may correspond to a displayable page of an application, sub-groups of the root group may correspond to sub-sections of the page, and assets within sub-groups may correspond to individual fields within the page.

For example, consider the scenario in which the application content is for requesting a user's administrative data. The root group may be a displayable page that has the user's administrative data. The root group may include separate sub-groups for user's name, user's home address, user's work address, and user's email. The sub-group for the user's name may include the assets for collecting a user's name. The sub-group for the user's address (e.g., home address, work address) may include separate sub-groups for house number, street, city, state, etc. The user's email sub-group may have assets to collect the user's email address.

FIGS. 3.1, 3.2, 3.3, and 3.4 show logical storage diagrams of the content repository in accordance with one or more embodiments of the invention. In the logical diagrams, the existence of a line between two components shows an existence of a logical relationship between the two components. The logical relationship may correspond to containment, a direct reference, an indirect reference, a cross-reference, or another storage mechanism for maintaining a relationship between devices.

In particular, FIG. 3.1 shows a logical diagram of a group storage structure (300) in accordance with one or more embodiments of the invention. As shown in FIG. 3.1, the group is hierarchical tree structure or hierarchy. The root group (e.g., node G1 (302)) is the highest node in the hierarchy and may correspond to the entire application content that is transmitted in response to a single request. In some embodiments, each separate application page may correspond to a separate hierarchy. Alternatively or additionally, application content which is intended to be transmitted together in response to a single request corresponds to an individual hierarchy. The root group (e.g., node G1 (302)) may optionally have one or more children groups (e.g., node G2 (304), node GN (306)). In other words, a parent child relationship between groups indicates that a child group is a sub-group of the parent group. A group may have any number of children sub-groups. Further, the depth or number of groups between the root group and a leaf node may vary. Leaf nodes (e.g., node A1 (308), node A2 (310)) of the group storage structure (300) correspond to assets. In other words, an asset does not have a child group. Rather, an asset has a parent group.

FIG. 3.2 shows a schematic diagram of a group entry (320) in the content repository. A group entry is a storage entry for a group in the content repository. In other words, the group entry may include data about a group, which is referred to as a current group below. The group entry may include a parent group identifier (ID) (322), a current group identifier (324), one or more variability tags (326), and one or more children identifiers (328). In general, an identifier is a unique identifier of a group or asset in the content repository. For example, the identifier may be alphanumeric, binary, symbolic, or a combination thereof identification of the asset or the group. Thus, the parent group ID (322) is the identifier of the parent of the current group. The current group ID (324) is the identifier for the current group. The child identifiers (328) are an identifier of one or more children. In other words, the child identifiers may be group identifiers for sub-groups of the current group or asset identifiers of assets in the current group.

In one or more embodiments of the invention, a variability tag (326) is a description of the application context for which the current group is designed. In other words, the variability tag defines the context of the application in which the assets in the group should be used. For example, the variability tags may include, but are not limited to, identification of platform type (e.g., mobile, desktop, web browser, etc.), form factor (e.g., small, medium, large, etc.), device capabilities (e.g., camera, available sensors, location sensing, etc.), language preferences (e.g., English, Spanish, etc.), user profile information (e.g., profession, age, demographics, etc.), user emotional state, complexity of user scenario, edition of application (e.g., stock keeping unit (SKU), student, professional, home) and/or any combination thereof.

A variability tag may also define a test case for the asset. In particular, the variability tag may include a test case identifier. The test case identifier is an identifier of a particular test case. In other words, multiple groups and/or assets may have the same tags and properties and have different test case identifiers. By way of a more concrete example, consider the scenario in which an application designer would like to test how a user interprets text of "Please enter your listed income from W-2" as compared to "My wages, tips, and other compensation listed on my W-2 is:". In the example, the application designer may create a first asset with variability tag "test case A" and asset content, "Please enter your listed income from W-2," and create a second asset with variability tag "test case B" and asset content, "My wages, tips, and other compensation listed on my W-2 is:". The remaining parts of the group and/or assets may be the same or substantially the same.

FIG. 3.3 shows a schematic diagram of an asset entry in the content repository (340) in accordance with one or more embodiments of the invention. As shown in FIG. 3.3, the asset entry (340) may include a parent group ID (342), an asset ID (344), a field ID (346), one or more asset property values (348), one or more variability tag(s) (350), and asset content (352) in accordance with one or more embodiments of the invention. The parent group ID (342), asset ID (344), and variability tag(s) (350) may be the same or similar to the identifiers and variability tags discussed above with reference to FIG. 3.2.

In one or more embodiments of the invention, although FIGS. 3.2 and 3.3 show the group entry and the asset entry as each including cross references to parent entry and child entries, the referencing may be single directional or may be based on another data structure for maintaining relationships. For example, only the child asset or group may include a reference to the parent group, or only the parent may include a reference to the child or children asset or group. By way of another example, the referencing may be based on containment of the child in the parent.

Continuing with FIG. 3.3, the field identifier (346) is a unique identifier of a field. For example, the field identifier may be alphanumeric, symbolic, a binary identifier, or a combination thereof of the field. By way of another example, the field identifier may be a binding to a location in a form. For example, if the application is designed to populate a form that is to be filed, the field identifier may be a name of the form and an identifier of a user input field on the form. By way of another example, the field identifier may be a unique identifier of a data structure and to entry in that data structure, which is generated by the application. Other unique identifiers may be used without departing from the scope of the invention.

In one or more embodiments of the invention, asset property values are values of the asset that define the function of the asset within the application and with respect to the field. For example, an asset property value may be prompt, help, informational, option, true, false, category, title, or other function value.

A prompt is a statement, question, or phrase that is presented to a user to request particular user data. For example, a prompt may be "Are you married?", "Do you have insurance?", "My insurance carrier is:", "First Name:", or an indication that the user is to provide information.

A help is additional information that may be provided to the user to assist the user in answering the request. For example, help may be an identification of a location in which a user may find the requested data, whether certain data should be included in requested data, the format type of the answer, and any other information that provides assistance in submitting the response to the request in the prompt.

Informational are facts and/or suggestion that are presented to the user. For example, informational may be "Too bad that you do not have insurance, you will have to pay a penalty," "The current federal interest rate is 2%," "Did you know that snow geese migrate more than 3000 miles?", or other information.

An option is a selectable answer that may be selected by a user. For example, an option may be a state in the United States, a range of incomes, or other selectable answers. Option may be combined with other asset property values, such as true and false, a number indicating a position of the particular option in a set of options, or another value.

A category is a classification of the field to be presented to the user. A title is a heading that is to be displayed with the field. For example, the title may be the title of the form and the category may be a subheading in the form.

In one or more embodiments of the invention, assets that have the same field ID and asset property values are alternatives of each other, regardless of which group includes the asset. In other words, if two assets have the same field ID and have the same asset property values, then only one of the two assets is presented to the user for the particular context. Namely, if two assets are defined for collecting the same data and presenting the same subject matter to a user, then the two assets have the same field ID and asset property values and different variability tags. For example, one asset may be for large screen sizes while another asset may be for small screen sizes. In the example, the first asset may have longer text (e.g., more words) than the second asset that has shorter text. By way of another example, one asset may be in complicated English for English speakers that are using a profession edition of the application while another asset in Portuguese is for Portuguese speakers, regardless of the edition of the application.

In one or more embodiments of the invention, assets that have the same field ID and different asset property values are complements to each other and are to be transmitted and displayed together. By way of an example, a single field ID may be related to a first asset that has an asset property value of option, a second asset that has a third asset property value of prompt, a fourth asset that has an asset property value of help, a fifth asset that has an asset property value of title. Each of the five assets may be in a same group indicating that each of the five assets should be transmitted together as application content for the field in accordance with one or more embodiments of the invention.

In one or more embodiments of the invention, groups that have assets including the same field ID are alternatives of each other. For example, if a first group and a second group both have at least one asset with the same field ID, then the first group is an alternative of the second group regardless of the number of assets in the first group or the second group or whether one or more other different field IDs are in the groups. Conversely, in one or more embodiments of the invention, sub-groups of a same group, whose assets are entirely different field IDs are complements of each other and are transmitted together as application content.

The above are example embodiments of differentiating between alternative presentations and additional presentations. Other mechanisms that do not require commonality of field ID and/or asset property values may be used without departing from the scope of the invention.

FIG. 4 shows three root groups, G1 (402), G4 (404), and G5 (406). Below is an outline of the assets in G1 (402), G4 (404), and G5 (406). Reference numbers next to the assets correspond to reference numbers in FIG. 4.

1. Group ID G1 (402) (Name)
   a. Group ID G2 (408) (First Name):
      i. Variability Tags: Large/English
      ii. Asset ID A1 (410):
         1. Variability Tags: Large/Student edition/English
         2. Field Identifier: First Name
         3. Asset Content: Please enter your first name
         4. Asset Property: Prompt
      iii. Asset ID A2 (412):
         1. Variability Tags: Large/English
         2. Field Identifier: First Name
         3. Asset Content: Enter First Name Here:
         4. Asset Property: Prompt
      iv. Asset ID A3 (414):
         1. Variability Tags: Large/English
         2. Field Identifier: First Name
         3. Asset Content: This is your legal first name
         4. Asset Property: Help
   b. Group ID G3 (416) (Last Name):
      i. Variability Tags: Large/English
      ii. Asset ID A4 (418):
         1. Variability Tags: Large/Student edition/English
         2. Field Identifier: Last Name
         3. Asset Content: Please enter your Last name
         4. Asset Property: Prompt
      iii. Asset ID A5 (420):
         1. Variability Tags: Large/English
         2. Field Identifier: First Name
         3. Asset Content: This is your legal last name
         4. Asset Property: Help
2. Group ID G4 (404) (First Name):
   a. Variability Tags: Small/English
   b. Asset ID A6 (422):
      i. Variability Tags: Small/English
      ii. Field Identifier: First Name
      iii. Asset Content: First name:
      iv. Asset Property: Prompt
   c. Asset ID A7 (424):
      i. Variability Tags: Small/English
      ii. Field Identifier: First Name
      iii. Asset Content: This is your legal first name
      iv. Asset Property: Help
3. Group ID G5 (406) (Last Name):
   a. Variability Tags: Small/English
   b. Asset ID A8 (426):
      i. Variability Tags: Small/English
      ii. Field Identifier: Last Name
      iii. Asset Content: Last name:
      iv. Asset Property: Prompt
   c. Asset ID A9 (428):
      i. Variability Tags: Small/English
      ii. Field Identifier: Last Name
      iii. Asset Content: This is your legal last name
      iv. Asset Property: Help In the above example and as shown in FIG. 4, G1 (402) includes group G2 (408) for requesting the first name and group G3 (416) for requesting the last name. Group G2 (408) has asset A1 (410), asset A2 (412), and asset A3 (414). Asset A1 (410) and asset A2 (412) are alternatives of each other. In other words, asset A1 (410) and asset A2 (412) are both prompts with a field identifier of first name. Asset A1 (410) is defined for large format, a student edition of an application, and English. Asset A2 (412) is for large format and English. In other words, asset A2 (412) is a default format for English speakers to display on large screens. Asset A3 (414) is a help that may be combined with asset A1 (410) or A2 (412).

Group G3 (416) has asset A4 (414) and asset A5 (420). Asset A4 (418) is a prompt. Asset A5 (420) is a help that complements the prompt of asset A4 (418). In one or more embodiments of the invention, when the content asset loader transmits the application content and selects group G1 for transmission, the content asset loader may transmit select A1 (410) or asset A2 (412) and transmit the selected asset along with the remainder of the tree.

Continuing with the example, group G4 (404) and group G5 (406) are alternatives to group G1 (402) for smaller screen sizes. In other words, rather than combining the first name and last name into a single application content to display on a single page, the first name request may be presented on one page and the last name request may be presented on a second page. In other words, group G4 (404) for requesting the first name has asset A6 (422) and asset A7 (424). Asset A6 (422) is a prompt requesting the first name. Asset A7 (424) is a help that complements the prompt of asset A6 (422). Further, group G5 (406) for requesting the last name has asset A8 (426) and asset A9 (428). Asset A8 (426) is a prompt requesting the last name. Asset A9 (428) is a help that complements the prompt of asset A8 (426).

In the example, if a computing device requests a first name field and is in the large form factor, then group G1 (402) may be transmitted as the application content with the first name and last name fields. As another example, if a computing device requests the first name field and is in the small form factor, then group G4 (404) may be transmitted instead of group G1 (402) as the application content. The computing device may then separately request the last name field.

FIGS. 5, 6, 7, 9, 10, 11.1, 11.2, 12, 13, 14, 15, and 16 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 5:
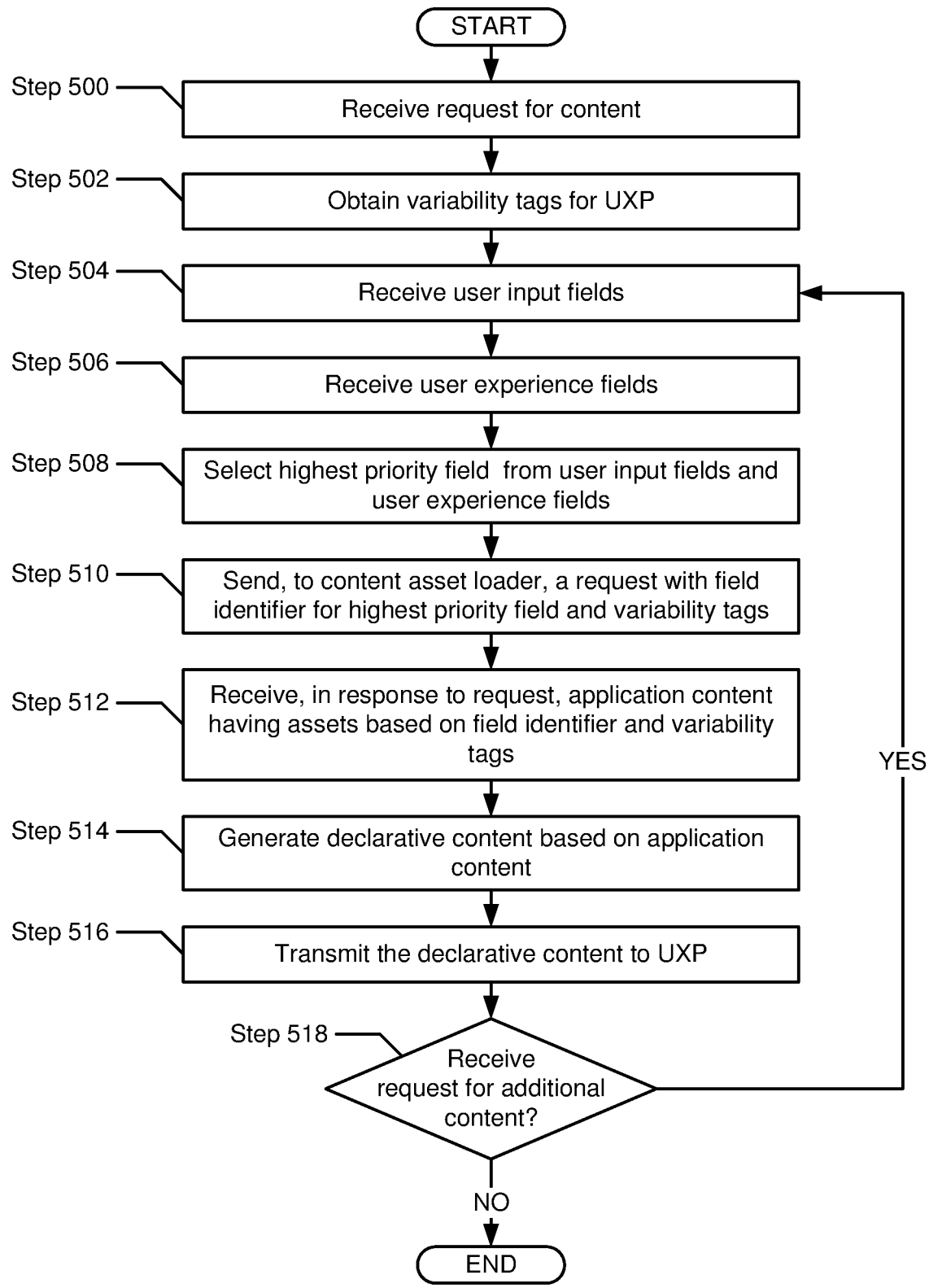
FIGS. 5, 6, and 7 show flowcharts in accordance with one or more embodiments of the invention.

FIG. 5 shows a flowchart describing a method for providing an application workflow using declarative content in accordance with one or more embodiments of the invention. In Step 500, a request for content is received in accordance with one or more embodiments of the invention. For example, a user experience player may transmit the request for content to a declarative content engine in response to a particular user action. The request for content may be part of a larger application workflow for obtaining content for a user. Specifically, the application workflow may be used to collect information from the user through a dynamic experience specific to the user. In one or more embodiments of the invention, the initial request from a user experience player may be the user experience player authenticating with the declarative content engine. Subsequent requests may be based on a command for navigation from a user or a submission of user data. Other request triggers may be used without departing from the scope of the invention.

In Step 502, variability tags are obtained for a user experience player in accordance with one or more embodiments of the invention. Depending on the user experience player making the request in Step 500, different application content may suit the particular user experience player. As such, various variability tags may be used to specify the context in which the application is used and, thereby, specify the requested type of content. Selecting and using variability tags in accordance with one or more embodiments of the invention are discussed in further detail with reference to FIGS. 3, 14, and 16.

In Step 504, user input fields are received in accordance with one or more embodiments of the invention. The user input fields may be received by the declarative content engine from a user content flow driver. Specifically, the user input fields may be selected by the user content flow driver in regard to information collected from the user as part of the application workflow. User input fields and the implementation of user input fields into the application workflow in accordance with one or more embodiments of the invention are discussed in further detail with reference to FIGS. 10, 11.1, 11.2, and 12.

In Step 506, user experience fields are received in accordance with one or more embodiments of the invention. The user content flow driver may select user experience fields for inclusion into the application workflow. Implementing user experience fields into the application workflow in accordance with one or more embodiments of the invention are discussed in further detail with reference to FIGS. 10 and 12.

In Step 508, the highest priority field is selected from the user input fields and the user experience fields in accordance with one or more embodiments of the invention. From among the user input fields and user experience fields, priority may be used to determine the particular order that fields are used in the application workflow. Using and updating priority in the selection of fields in accordance with one or more embodiments of the invention are discussed in further detail with reference to FIGS. 12 and 13.

In Step 510, a request with a field identifier for the highest priority field and variability tags is sent to a content asset loader in accordance with one or more embodiments of the invention. As such, the declarative content engine may send a field identifier to the content asset loader that corresponds to the highest priority field. The content asset loader and field identifiers in accordance with one or more embodiments of the invention are discussed in further detail with reference to FIGS. 3, 4, 14 and 15.

In Step 512, in response to the request, application content is received that has assets based on the field identifier and variability tags in accordance with one or more embodiments of the invention. The content asset loader may select content that corresponds to the variability tags in Step 502 and the field identifier with the request in Step 510. As such, respective content for the application workflow may be selected for the user experience player. Determining and providing the application content in accordance with one or more embodiments of the invention are discussed in further detail with reference to FIG. 13.

In Step 514, declarative content is generated based on the application content in accordance with one or more embodiments of the invention. Specifically, the declarative content engine may generate declarative content for use by the user experience player. Generating declarative content in accordance with one or more embodiments of the invention is discussed in further detail with reference to FIG. 7.

In Step 516, the declarative content is transmitted to a user experience player in accordance with one or more embodiments of the invention. The user experience player may use the declarative content to display application content to the user. Transmitting declarative content in accordance with one or more embodiments of the invention is discussed in further detail with reference to FIG. 7.

In Step 518, a determination is made whether a request was received for additional content in accordance with one or more embodiments of the invention. If there is no request for additional content and the application workflow is complete, the process proceeds to the end. If there is a request for additional content, the application workflow continues and the process returns to Step 504.

Figure 6:
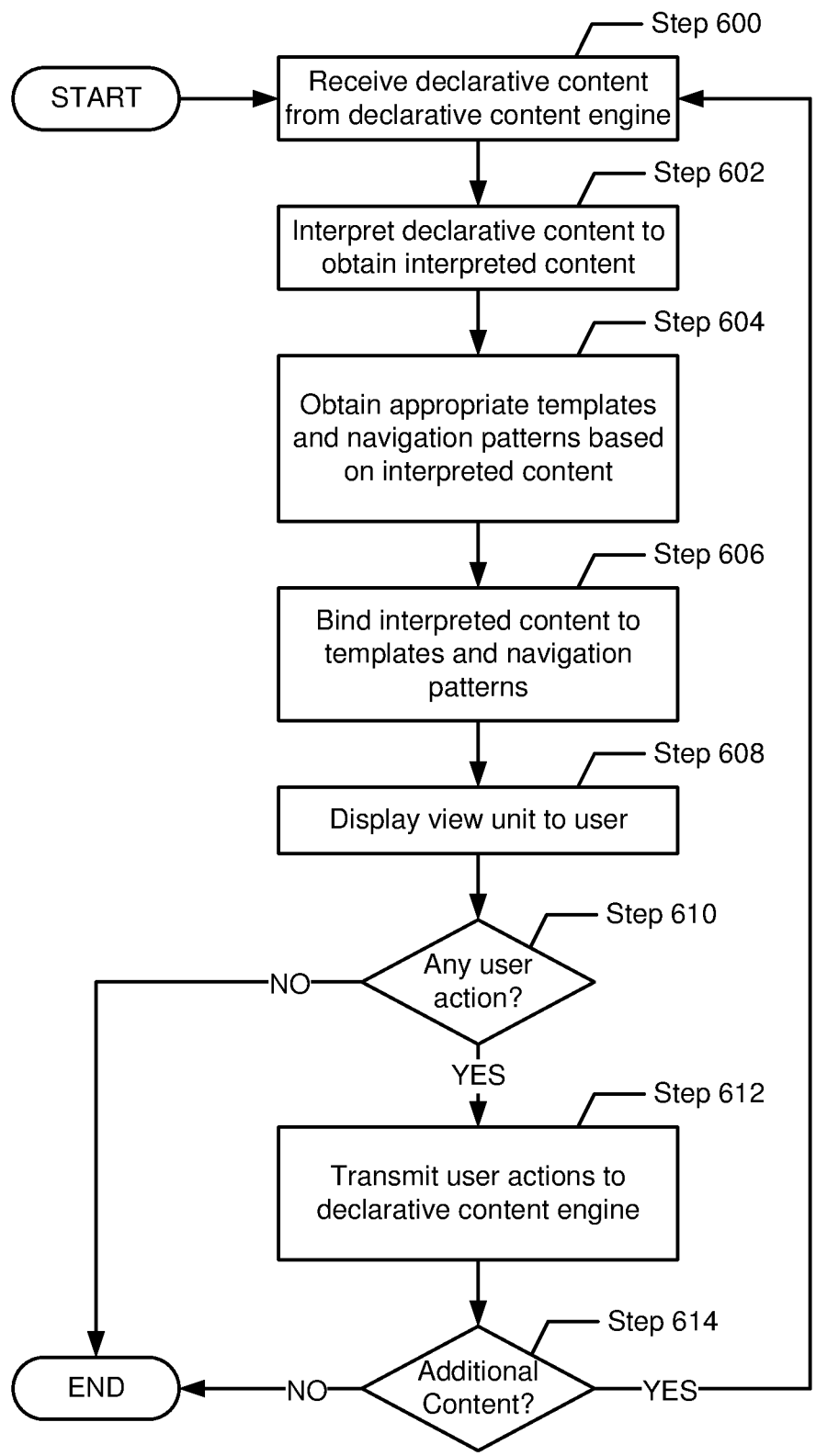
Figure 7:
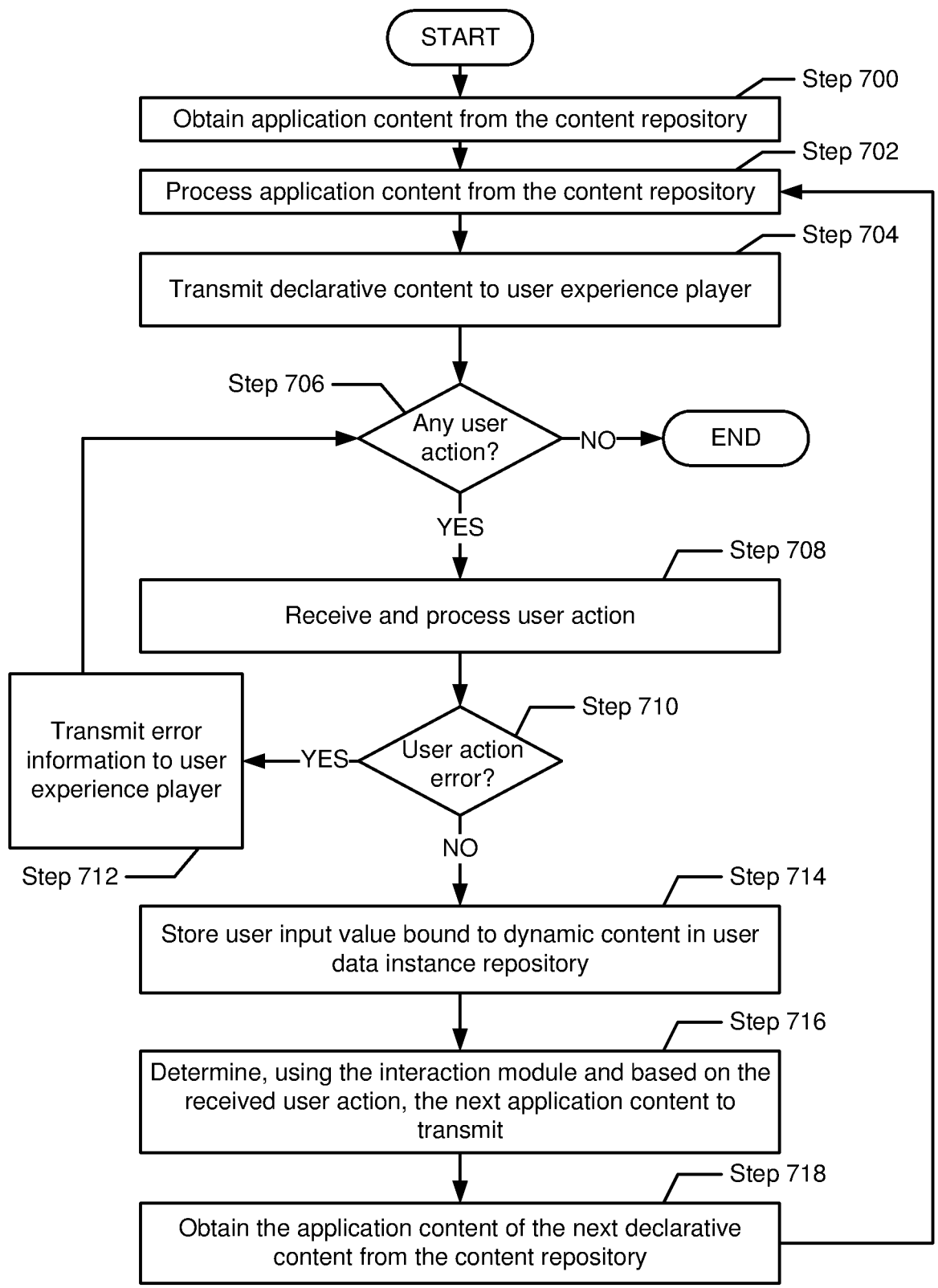
Figure 8:
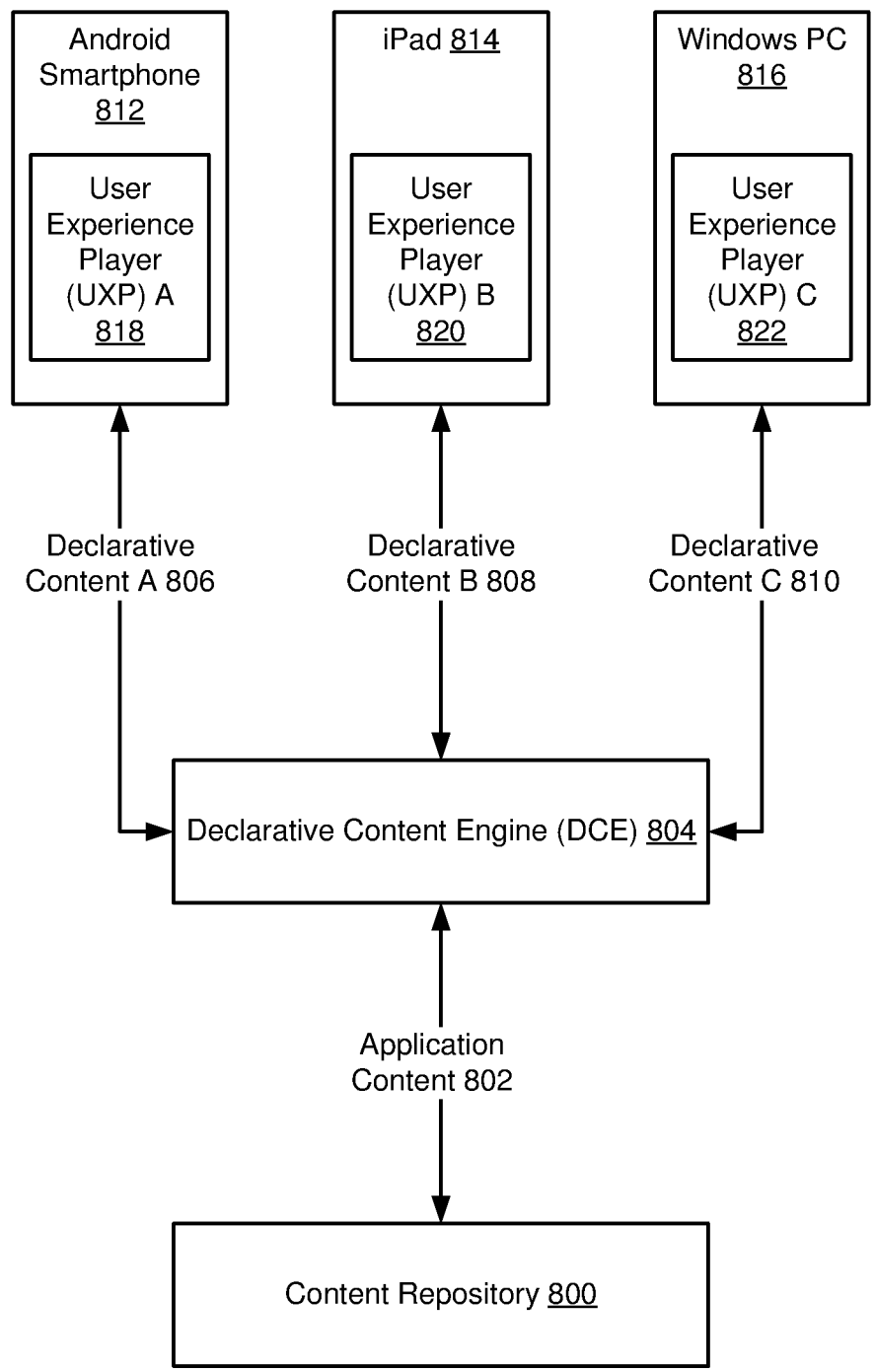
FIG. 8 shows an example in accordance with one or more embodiments of the invention.
Figure 9:
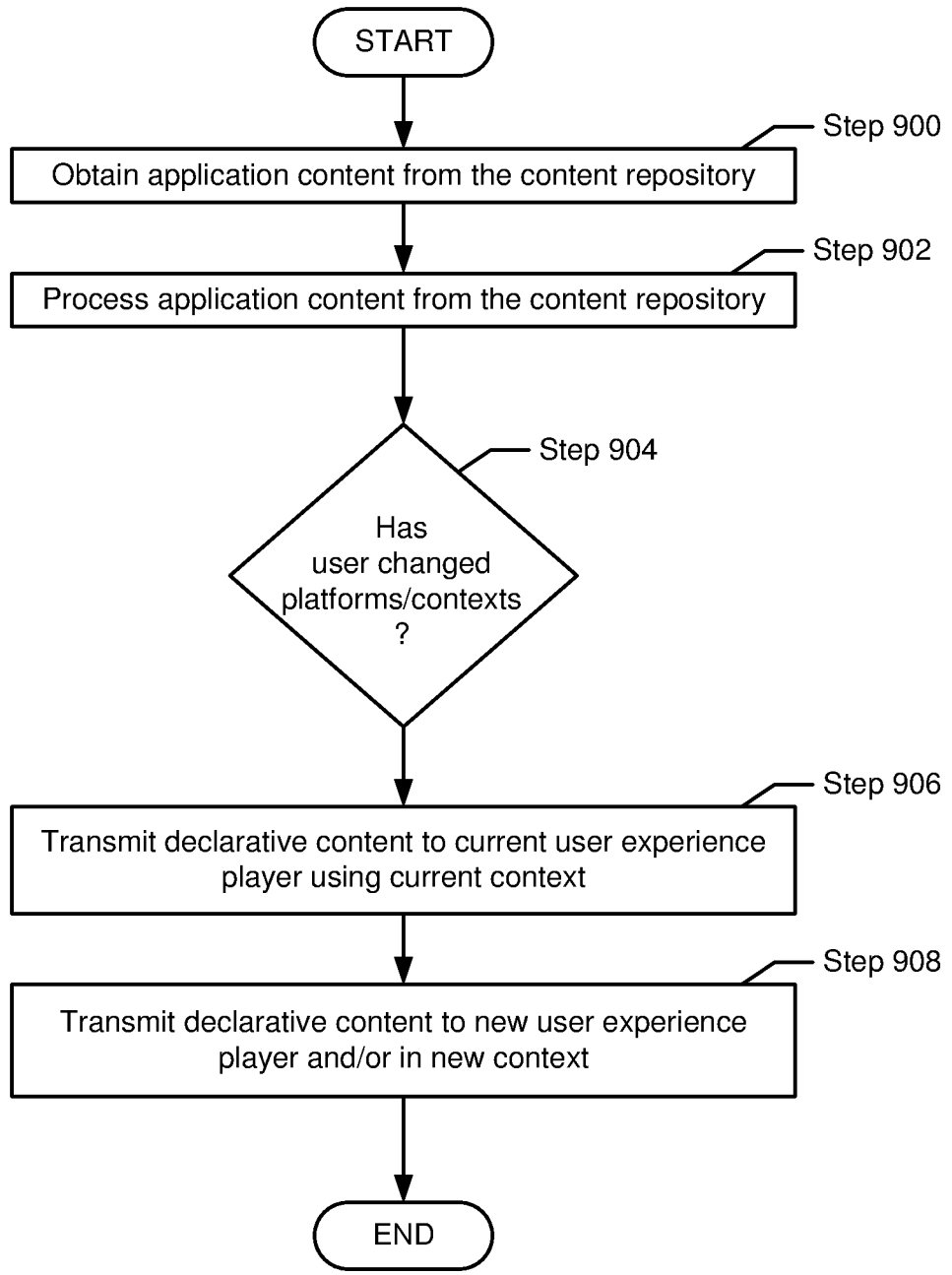

Turning to FIGS. 6-9, FIGS. 6-9 are directed to generating, transmitting and processing declarative content in accordance with one or more embodiments of the invention. In particular, FIG. 6 may describe using declarative content and be from the perspective of a user device. FIG. 7 may describe the generation of declarative content from the perspective of a declarative content engine. FIG. 8 is an example in accordance with one or more embodiments of the invention. FIG. 9 may describe the generation and transmission of declarative content from the perspective of a declarative content engine.

FIG. 6 shows a flowchart describing a method for processing declarative content from a declarative content engine and rendering application content for a user of an application. In Step 600, declarative content is received at a UXP from a DCE. Declarative content may be expressed in any declarative programming language (e.g., JSON). In one or more embodiments of the invention, the received declarative content includes application content as well as additional related content (e.g., interaction flow and logic information). In one or more embodiments of the invention, the declarative content is received from an operatively connected declarative content engine. For example, the UXP may be executing on a tablet device that is operatively connected to the server on which the DCE executes via a series of wireless and wired networks.

In Step 602, the declarative content is interpreted. In one or more embodiments of the invention, the declarative content is interpreted by a declarative content interpreter, which may be a portion of the UXP. In one or more embodiments of the invention, interpretation of the declarative content includes, but is not limited to, parsing the received declarative content in order to obtain the application content and related content included therein. In one or more embodiments of the invention, interpreting the declarative content also includes making the interpreted content available for use by the other portions of the UXP.

In Step 604, the UXP obtains appropriate templates and navigation patterns based on the interpreted content. In one or more embodiments of the invention, the templates and navigation patterns, which may be visual and/or non-visual, are obtained from one or more native rendering libraries included with, and/or operatively connected to, the UXP.

In Step 606, the relevant portion of the interpreted content is bound to the one or more templates and navigation patterns obtained in Step 604. In one or more embodiments of the invention, a binding module of the UXP performs the binding. Binding content to templates and navigation patterns may include creating a relationship between portions of the interpreted content, the templates, and navigation patterns in order to prepare the content as a view unit for presentation to a user.

In Step 608, a view unit is rendered for a user. In one or more embodiments of the invention, rendering a view unit includes displaying application content to a user of an application. In one or more embodiments of the invention, a rendering module of the UXP includes functionality to render content that has been bound, as in Step 606, to templates and navigation patterns. The rendered view unit may be visual, non-visual, or any combination thereof. For example, a rendered view unit may be a visual presentation of a screen of a tax preparation application. In such an example, the rendered view unit may include, but is not limited to, text, graphics, data entry fields for entering user information, questions to be answered by a user, data entry fields for a user to enter answers to presented questions, actuating buttons for user selections, drop down menus for user selection, or any other information relevant to the tax preparation application that is to be rendered to a user.

In Step 610, a determination is made as to whether any user action was taken in response to the display of the view unit. For example, a user may enter personal data, answer a question, make a selection, press a button, speak a help query, gesture to indicate an answer, switch platforms, change desired mode of interaction (e.g., from visual to non-visual), decide to save and/or pause the application, and/or any other possible form of user action. User actions may be actuated by any means supported by the platform on which a user executes an application that operates in conjunction with a UXP. For example, user action may include, but is not limited to, keyboard input, mouse input, audio input, motion input, and touch input. For another non-limiting example, electromagnetic input may be received from a user via one or more electrodes. User action may be actuated through any form of biometric input. For example, fingerprints and/or eye movements may be used to input a user action. User action may additionally be actuated by any peripheral device that is operatively connected to the platform. For example, glasses or contact lenses may be operatively connected to the platform and used to actuate the receipt of user responses to questions and/or for a user to enter user information into data entry fields of an application. Such a user action may be in response to the view unit rendered and/or may be any other chosen user action supported by the application that the user is executing. In one or more embodiments of the invention, there is a timeout period associated with a given view unit during which a UXP will wait for a user action. In one or more embodiments of the invention, the application will not move forward unless a user action occurs. If one or more user actions occur, then the process moves to Step 612. If a user action does not occur, then the process proceeds to end.

Turning to Step 612, the one or more user actions are transmitted from the UXP to the DCE. In one or more embodiments of the invention, the user actions are expressed in a declarative programming language. For example, the user actions may be expressed as a JSON response. In one or more embodiments of the invention, the transmission of the user action(s) occurs over a network and/or a collection of one or more interconnected networks (e.g., the Internet).

In Step 614, a determination is made as to whether additional declarative content is to be transmitted from the DCE to the UXP that transmitted the user actions. Additional content may be required in response to any user action, in response to a user error, in order to advance through the application, and/or in response to a timeout. Additional content may include, but is not limited to, additional application content, a next view unit, additional interaction flow and logic information, additional user data model information, additional data instances, and/or additional user information. If there is no additional content, the process proceeds to end. If there is additional content, the DCE prepares additional declarative content and the process returns to Step 600.

FIG. 7 shows a flowchart describing a method for providing declarative content from a DCE to at least one UXP. In Step 700, application content is obtained by a DCE from an operatively connected and/or included content repository that stores application content. In one or more embodiments of the invention, the application content is obtained in order to initiate an application, in response to one or more user actions, and/or any other reason relevant to the execution of the DCE and/or the application being executed by a user.

In Step 702, the application content is processed by the DCE. In one or more embodiments of the invention, the application content is processed to obtain at least part of the declarative content for transmitting a view unit to a UXP. In one or more embodiments of the invention, processing the application content includes generating and/or obtaining additional content that is to be expressed as declarative content along with the application content. In such embodiments of the invention, additional content may include, but is not limited to, interaction flow and control information, user data model information, data instance information, and/or user related information.

In Step 704, the application content and additional content obtained and expressed as declarative content in Step 702 is transmitted to a UXP from the DCE. In one or more embodiments of the invention, the DCE is operatively connected to at least one UXP. For example, the DCE may be executing on a server that is connected via a computer network to one or more clients on which a UXP executes. Transmission of the declarative content may include using the network functionality of the computing device on which the DCE executes in order to appropriately package the declarative content for transmission over a network.

In Step 706, a determination is made as to whether any user action has occurred. In one or more embodiments of the invention, a user action is determined to have occurred when a UXP transmits one or more user actions expressed as declarative content to the DCE. In other embodiments of the invention, the user action(s) may be expressed in any way that the DCE is capable of receiving. If a user action occurs and declarative content expressing the user action is received by the DCE, the process moves to Step 706. If no user actions occur, the process proceeds to end.

Turning to Step 708, the user action is received and processed by the DCE. In one or more embodiments of the invention, the user action(s) arrives expressed as declarative content. User actions may have occurred in response to the declarative content transmitted in Step 704 and/or for any other reason relevant to a user's use of an application. In one or more embodiments of the invention, the received user action(s) are processed by the DCE. In one or more embodiments of the invention, processing the user action(s) includes evaluating the actions in order to determine what action, if any, should be taken next by the DCE. For example, the user action may have included an input value, which is stored, and an answer to a question, which may dictate at least in part, the interaction flow and subsequent application content to be expressed as declarative content and transmitted to the UXP. For another example, the user action may have been to switch platforms, in which case the DCE's next transmission of declarative content will be sent to the new platform. For another example, the user may desire to switch application context, such as from non-visual to visual, in which case the next transmission of declarative content from the UXP would reflect the user's preference change.

Turning to Step 710, a determination is made as to whether the user action was an error. In one or more embodiments of the invention, the UXP includes functionality to determine if the user action created and/or was an error. In such embodiments of the invention, the declarative content received by the DCE from the UXP will include information related to one or more errors derived from a user's action(s). In other embodiments of the invention, the DCE includes functionality to determine, based on the received and processed user action information, if an error has occurred. If a user action error has occurred, the process moves to Step 712. If no user action error has occurred, then to process moves to Step 714.

Turning to Step 712, information related to an error is transmitted as declarative content to a UXP. In one or more embodiments of the invention, the DCE may obtain information related to the error, based on the user action error, and express the error information as at least part of additional declarative content. In one or more embodiments of the invention, the declarative content including the error information is transmitted to the UXP in order to be conveyed, at least in part, to the user of an application in which the error occurred. After the error information is transmitted from the DCE to the UXP, the process returns to Step 706 in order to wait for additional user action(s).

Returning to Step 714, any user input values included in the declarative content received by the DCE from the UXP are bound to dynamic content in the user data instance repository. In one or more embodiments of the invention, the user data instance repository stores, at least, a record of user input values bound to related dynamic content. The record may allow, for example, one or more UXPs to retrieve the user input information for later use by the application.

In Step 716, the DCE determines the next application content to be transmitted as a portion of a declarative content transmission. In one or more embodiments of the invention, the DCE uses, at least, the interaction module and the received user action in order to determine what application content is needed next. The DCE may determine the next application content in accordance with the discussion below with reference to FIGS. 10-13.

In Step 718, the DCE obtains the next application content from the content repository. The DCE may transmit a request to the content repository via the asset content loader and the asset content loader may process the request in accordance with the discussion below with reference to FIGS. 14-16. In one or more embodiments of the invention, the DCE requests the application content determined in Step 716 to the relevant next application content to be transmitted to the UXP. After the next application content is obtained by the DCE, the process returns to step 702, after which the next application content is processed and ultimately transmitted to a UXP as at least a portion of a next declarative content.

FIG. 8 shows an example in accordance with one or more embodiments of the invention. The following example is for explanatory purposes only and not intended to limit the scope of the invention.

Referring to FIG. 8, consider a scenario in which a declarative content engine (DCE) (804) is operatively connected to a content repository (800). The DCE is also operatively connected to three platforms (i.e., three client devices). The first platform is an Android-based smartphone (812) on which UXP A (818) is executing. The second platform is an iPad (814) on which UXP B (820) is executing. The third platform is a Windows personal computer (PC) (816) on which UXP C (822) is executing. Each of the three platforms is being used by a different user (not shown) to execute a tax return preparation application, with which the UXP executes in conjunction. Between the content repository and the DCE, a conduit exists for transmitting application content (802). Although only one such conduit is shown in the example, there may be as many as necessary in order to perform aspects of the invention. The conduit may be, for example, a connection between a server and a storage device. Each of the three platforms is connected to the DCE via the Internet (not shown).

The tax return preparation application being used by each user necessarily includes a series of events in which information relevant to a tax return of a user is obtained from the user. One screen in the series of screens for obtaining information from a user of the tax return preparation application is a screen in which the user is asked what portion of the previous year the user maintained health insurance. Possible responses include: (i) "Had health insurance all year"; (ii) "Had no health insurance"; and (iii) "Had health insurance for part of the year". The question and each of the three possible answer choices are presented to each user when that user encounters the appropriate portion of the tax return preparation application. The DCE expresses this content, as well as related content, as declarative content (e.g., declarative content A (406), declarative content B (408), and declarative content C (410)) to be transmitted to the UXP of each user's platform whenever that user requires the view unit that includes the question and answer choices.

To that end, the DCE first obtains relevant application content from the content repository. The DCE then processes the application content along with any other relevant factors in order to obtain the various pieces of declarative content to be transmitted to a UXP. The DCE may perform the action of obtaining the application data whenever one of the user's reaches the appropriate portion of the application flow.

The declarative content obtained by the DCE includes view content, which includes metadata (to indicate the type of the unit of display ("Q&A")), title (with text content), and data entry fields (collection of multiple data entry fields). In this example, there is a single field, with type "choice" and three "choices". View data may also include information related to binding (data field to set the value upon selection) and (actions) (navigation actions (Next and Prev) are included). The view information portion of the declarative content may be expressed as follows:

```
{ "metaData": { "type": "Q&A", "id": "ACACoverage"},
    "title": { "asset": "How long did you have health insurance in 2014?"},
    "fields": [
        { "type": "choice",
          "choices": [
              { "label": { "asset": "Had health insurance all year"},
```

```
        "value": "HadFullYearPlan" },
      { "label": { "asset": "Had no health insurance"},
        "value": "HadNoPlan" },
      { "label": { "asset": "Had health insurance part of the
year"},
        "value": "HadPartYearPlan"} ],
    "binding":
"Return.ReturnData.IRS1040ScheduleACA.CoverageIndPP"
  } ],
  "actions": [
    { "label": { "asset": "Continue"},
      "value": "Next"}
    { "label": {"asset": "Back"},
"value": "Prev"} ] }
```

The declarative content obtained by the DCE also includes interaction flow and logic content, which may be expressed as follows:

```
      "ACASingleFlow": {
        "startState": "VIEW_node",
        "VIEW_node": {
          "state_type": "VIEW",
          "ref": "ACACoverage",
          "transitions": {
            "Next": "END_done"
          }
        },
        "END_done": {
          "state_type": "END",
          "outcome": "doneWithFlow"
        }
      }
```

The declarative content obtained by the DCE also includes user data model information, which may be expressed as follows:

```
  {
    "IRS1040ScheduleACAType": {
      "CoverageIndPP": {
        "type": "EnumType",
        "validation": [
          { "message": "Please select one of the options",
            "type": "required" } ],
        "enum":    ["HadFullYearPlan",    "HadPartYearPlan",
"HadNoPlan"],
        "default": ""
      },
      "SubsidyEligibleAmtPP": {
        "type": "USAmountNNType",
        "default": ""
  } } }
```

The above examples of declarative content expressions are sent to a UXP any time a user reaches the appropriate point in the application where the aforementioned question is to be asked of the user.

On the client side, a UXP executes on a user's platform (e.g., the Android smartphone (812), the iPad (814) and/or the Windows PC (816)). When the declarative content is received from the DCE by a UXP, a declarative content interpreter interprets the declarative content. Next, the UXP obtains, from one or more native rendering libraries, visual templates and navigation patterns that are specific to the platform on which the UXP executes. Content to be displayed to the user of the application (i.e., the question and the corresponding answer options) is then bound to the visual templates and navigation patterns and displayed to the user. The display of the content, as viewed by the user, may be different on each platform type. Each platform type has a different set of capabilities and functionality, therefore each user experience may differ (e.g., be optimized) for a given platform based on the platform characteristics.

For example, the Android smartphone user may see a visual representation of the application background, the question written in a first font, and each of the answer choices listed next to a circle which a user may select to indicate the corresponding answer choice. The iPad user's UXP receives the same declarative content as was received by the UXP of the Android smartphone in the previous example. However, the iPad user has a different user experience that includes a visual representation of the application background, the questions rendered in a second font, and three large buttons. Each of the three buttons includes one of the three answer options, requiring the user to "press" one of the three buttons using some form of cursor control mechanism (e.g., mouse, trackball, touchpad, audio control device, etc.). The Windows PC user's UXP receives the same declarative content as was received by the UXP of the Android smartphone and the iPad in the previous examples. However, the Windows PC user has a different user experience which includes a visual representation of the application background, the question being rendered in a third font, and a data entry field for which a drop down menu exists which includes the three answer options.

In this example, the user in each case has had insurance coverage for the entirety of the previous year. Accordingly, each select the answer option indicating that insurance was maintained for the full previous year. Therefore, the UXP for each prepares a response to send to the DCE that includes the response to the question. The response is expressed as declarative content and may appear as follows:

```
  {
    "IRS1040ScheduleACA": {
      "CoverageIndPP": "HadFullYearPlan",
      "SubsidyEligibleAmtPP ": "4750",
    }
  }
```

This content represents a user data instance and may be bound by the DCE with dynamic content related to each user, respectively and stored in the user data instance repository.

In the above described example, three entirely different platforms, each executing a UXP, received the same declarative content from the DCE. However, the application, or portion thereof (in this case the view unit for the question regarding previous year's insurance), is rendered differently on each platform based, at least in part, on the native capabilities of the platform on which the UXP executes.

FIG. 9 is a flowchart that demonstrates an exemplary embodiment of the invention in which a user switches from a first platform while progressing through an application and/or in which a user switches from a first context to a second context. Steps 900 through 902 of FIG. 9 are substantially similar to Steps 300 through 302 of FIG. 3.

In Step 904, a determination is made as to whether a user has switched platforms and/or contexts. A user may decide to move from a first platform on which the user is executing an application to a second platform on which the user wants to execute the same application. The determination may be made explicitly, via a UXP of the first platform and/or the second platform informing the DCE of the user move. The determination may also be made implicitly, with the DCE detecting the platform change. The user may also or alternatively decide to switch contexts. For example, a user who has been interacting with the application in an audio context while driving a car may decide to switch to a visual context upon arriving at home. If a determination is made that a user has decided to switch platforms, contexts, and/or any combination thereof, the process moves to Step 908. If no switch has been made by the user, the process proceeds to Step 906 and the declarative content is transmitted to the current platform and/or context.

Turning to Step 908, if the user has switched platforms, then the declarative content is transmitted to a new UXP on which the user wants to continue executing the application. In one or more embodiments of the invention, the new UXP may be executing on a different platform type, and therefore the user experience changes to correspond to the new platform. If the user has additionally and/or alternatively decided to switch contexts, then the declarative content is modified to reflect the new user-desired context. In one or more embodiments of the invention, the DCE may modify (e.g., optimize) the declarative content for the new context. In such embodiments of the invention, the modification may be based, at least in part, on the platform capabilities related to the desired context.

In the exemplary embodiment of the invention described in the flowchart of FIG. 9, the determination of the change may occur after new content has been obtained and expressed as declarative content to be transmitted to a UXP. However, the invention may also include functionality to detect a change before determining and obtaining new declarative content to transmit. In such embodiments of the invention, the previously rendered content (i.e., previously presented to the user on the first platform and/or in the first context before a switch happens) is expressed as modified declarative content and transmitted to the UXP to be rendered on the new platform and/or in the new context.

An additional exemplary embodiment of the invention includes a declarative content filter. In such an embodiment of the invention, the DCE may include an intelligent asset loader that includes functionality to filter declarative content based on variability tags. Variability tags may include, but are not limited to, platform type, (e.g., mobile, desktop, web browser, etc.) form factor (e.g., small, medium, large, etc.), device capabilities (e.g., camera, available sensors, location sensing, etc.), language preferences (e.g., English, Spanish, etc.), user profile information (e.g., profession, age, demographics, etc.), user emotional state, complexity of user scenario, and/or any combination thereof.

In an additional exemplary embodiment of the invention, the DCE may be used in order to conduct, at least in part, A-B testing. A-B testing is testing in which a user is presented with two different options (e.g., an "A" option and a "B" option) and selects one of the two as the preferred option. The selection of the preferred option may be provided to the DCE, which includes functionality to receive the user's selection. The DCE may also include functionality to collect such information from any number of users who are making A vs. B decisions on any number of potential view units delivered to a UXP from a DCE. Such embodiments of the invention may allow for scalable A-B testing of applications rendered by UXPs of the invention.

In an additional exemplary embodiment of the invention, the DCE includes additional functionality to create an application shell that manages, at least in part, at least two applications executing on two separate platforms, but that are being used by the same user. In such embodiments of the invention, a user may be moving between platforms and therefore the application shell maintains the necessary data to allow each individual application to remain current in the interaction flow and with the latest user entered information as the user moves platforms. For applications such as tax preparation applications, a user may take a considerable amount of time in order to complete a given tax return. Accordingly, the application shell provides the user the capability of moving between devices. The application shell may serve as a master controller to manage the launch and switch of different UXPs, handle cross-communication between the UXPs and orchestrate user interaction among the different UXPs.

In an additional exemplary embodiment of the invention, the DCE includes additional functionality to monitor various user data such as, for example, user interaction speed, scenario complexity, network connection speed, and network connection reliability. In one or more embodiments of the invention, the DCE includes functionality to use the user information in order to predict possible future workflows and to decide which and how much potential future content to pre-fetch to client devices on which an operatively connected UXP is executing.

Figure 12:
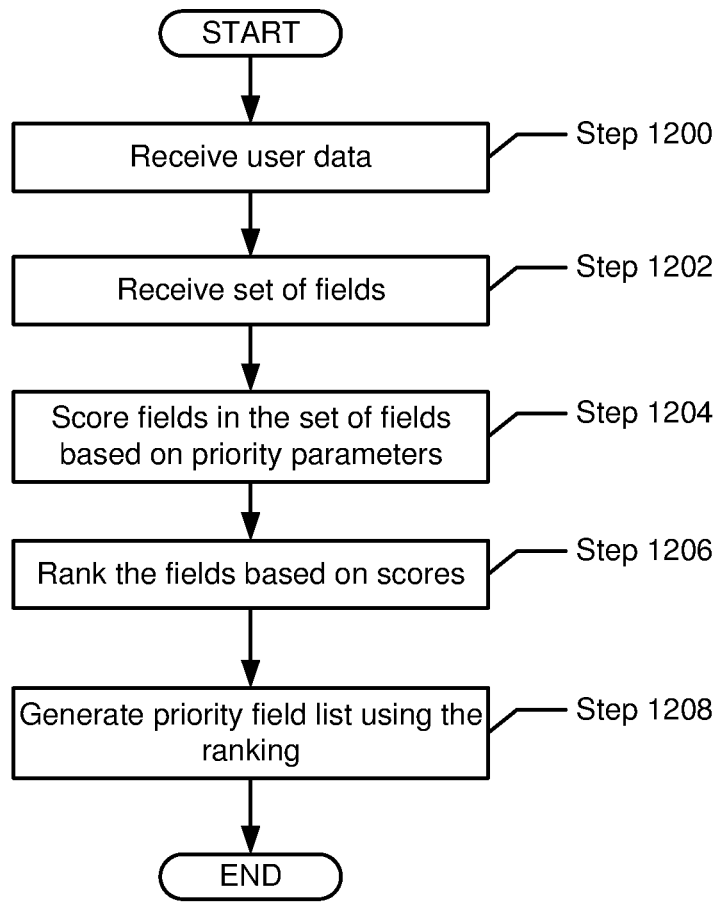
Figure 13:
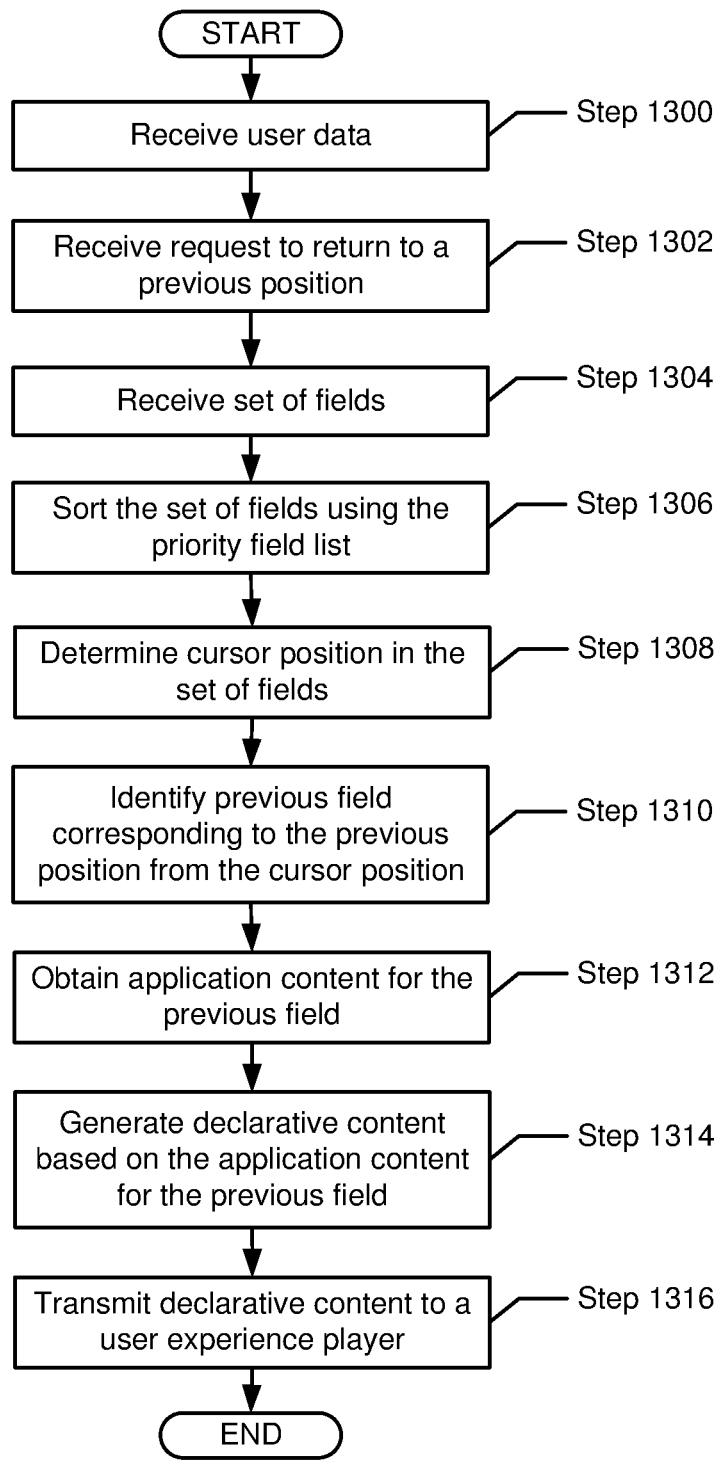

Turning to FIGS. 10-13, FIGS. 10-13 are directed to organizing an application workflow in accordance with one or more embodiments of the invention. In particular, FIGS. 10, 11.1, and 11.2 describe the use of a set of fields for determining an order of application content according to a priority field list in accordance with one or more embodiments of the invention. FIG. 12 describes the generation and/or updating of a priority field list in accordance with one or more embodiments of the invention. FIG. 13 describes return to a previous position in an application workflow in accordance with one or more embodiments of the invention.

Figure 10:
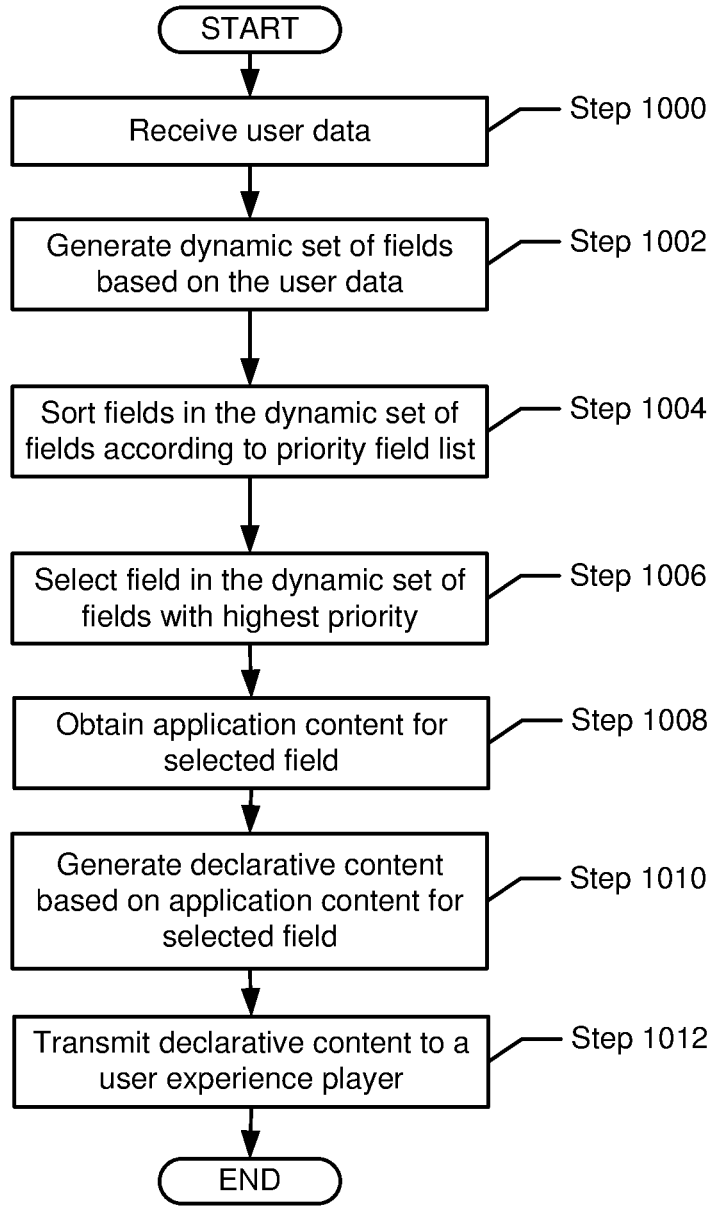

Turning to FIG. 10, FIG. 10 shows a flowchart describing a method for organizing an application workflow for users. In Step 1000, user data is received. The user data may be received at a user content flow driver regarding one or more users. For example, data may be submitted by a user through an input device of a user experience player. Specifically, the data may be submitted in response to application content displayed in a rendering view unit. In some embodiments of the invention, the user may indirectly submit the user data. For example, the user may submit a location and/or login credentials of the user data and one or more components of the system may obtain the user data from the specified location.

In Step 1002, a dynamic set of fields is generated based on the user data in accordance with one or more embodiments of the invention. The dynamic set of fields may include user input fields to a data model as well as user experience fields. In one or more embodiments of the invention, fields in the dynamic set change while a user executes a particular application workflow for an application. In other words, the dynamic set of fields change so that only relevant fields are presented to the user in accordance with one or more embodiments of the invention. For example, in response to particular user data provided by the user, the application workflow may take a particular path of questions during the application. As such, the particular path may be reflected in the dynamic set of fields generated at present. If a user returns to a previous question and modifies the user's answer, the fields in the dynamic set of fields may change accordingly to account for changes to the user data.

In Step 1004, the dynamic set of fields is sorted according to a priority field list in accordance with one or more embodiments of the invention. The priority field list may determine the order that user input fields or user experience fields are used by a declarative content engine. As such, the dynamic set of fields may be sorted to place a field with the highest priority at a top of a queue, while a field with very low or no priority is placed at the bottom of the queue. The priority field list is discussed below and in FIG. 12.

In Step 1006, a field with the highest priority is selected next from the dynamic set of fields in accordance with one or more embodiments of the invention. Specifically, the user content flow driver may determine which user input fields are missing information from the user. From the user input fields with missing information, the user content flow driver may determine which of those user input fields have the highest priority using the priority field list.

In Step 1008, application content is obtained for the selected field in accordance with one or more embodiments of the invention. In one or more embodiments of the invention, the declarative content engine may send a request to a content asset loader for application content that corresponds to the selected field. In one or more embodiments of the invention, the request includes a field identifier of the requested field. The content asset loader may obtain the application content from a content repository and respond with the application content. In one or more embodiments of the invention, the application content may include assets for the requested field corresponding to the field identifier as well as assets for additional fields. If additional assets are transmitted, the entire application content may be transmitted to the user.

In Step 1010, declarative content is generated based on the application content for the selected field. The declarative content engine may use the received application content to generate declarative content for a user experience player. Generating the declarative content in one or more embodiments of the invention is discussed above with reference to FIG. 7.

In Step 1012, the declarative content is transmitted to a user experience player in one or more embodiments of the invention. Transmitting the declarative content in one or more embodiments of the invention is discussed above with reference to FIG. 7.

Turning to FIGS. 11.1 and 11.2, FIGS. 11.1 and 11.2 show flowcharts describing a method for organizing an application workflow for users. In Step 1100, a set of fields is received by a user content flow driver in one or more embodiments of the invention. The set of fields may include user input fields and/or user experience fields. In one or more embodiments of the invention, the set of fields in Step 1100 is a family group that acts as a library of user input fields and/or user experience fields for use in the application workflow. The set of fields in Step 1100 may also include an initial set of fields for use as a default group before a dynamic set of fields is generated in Step 1114 below.

In one or more embodiments of the invention, the set of fields is determined by the user content flow driver based on preexisting data known with respect to a particular user. For example, the preexisting data may be obtained from a user account associated with the particular user. The preexisting data may also correspond to information previously submitted by the particular user, for example, in preparing a previous year's tax return, in applying for a loan, or in executing a previous financial transaction. As such, the user content flow driver may use the preexisting data to determine an initial set of fields.

In Step 1102, a user input field is selected from the set of fields using a priority field list in one or more embodiments of the invention. The priority field list may describe the order that specific fields are selected by the declarative content engine in generating declarative content for a user experience player. As such, one or more priority fields may be located near the front of the priority field list, while one or more fields with low priority or no priority may be placed near the back of the priority field list. Fields may be selected by the user content flow driver and sent to the declarative content engine for determining application content until a user input field is reached.

In one or more embodiments of the invention, the set of fields is organized into a queue. For example, the user content flow driver may obtain the next field in the queue for the declarative content engine. The queue may match with the priority field list. As such, the user content flow driver may automatically select the next field in the queue when the declarative content engine requests a field for generating application content.

In one or more embodiments of the invention, the priority field list may include additional fields not in the set of fields. In particular, the priority fields list may be an ordering of all possible fields while the dynamic set of fields are only the subset of the possible fields that are relevant to the user. In such a scenario, organizing the set of fields may be performed by identifying a position of each field in the set of fields in the priority fields list and ignoring the portion of the priority fields list that is excluded from the set of fields.

In Step 1104, application content is obtained that corresponds to the selected user input field in one or more embodiments of the invention. Specifically, the user content flow driver may send the selected user input field to a declarative content engine. In response, the declarative content engine may obtain, from a content asset loader, application content corresponding to the selected user input field.

In Step 1106, declarative content is generated that corresponds to the application content. In Step 1108, the declarative content is transmitted to a user experience player. The user experience player may interpret the declarative content to display application content. Generating and transmitting the declarative content in one or more embodiments of the invention is discussed above and in FIG. 7. In response, the user experience player may determine whether any user action was taken in response to the displayed application content. User data may be identified based on a particular user action and sent back to the declarative content engine as declarative content.

In Step 1110, user data is received by the user content flow driver in response to transmitting the declarative content. For example, the user data may correspond to a specific user input field, e.g., the user input field in Step 1102. As such, the user data may include specific information, such as personal and/or business data, provided by a user. The user experience player may receive the specific information and send the specific information to the declarative content engine. The declarative content engine may then forward the specific information to the user content flow driver.

In Step 1112, a determination is made whether all user data has been received. In one or more embodiments of the invention, the user content flow driver determines whether a particular result may be computed based on previously received user data. For example, after a user has provided data for each user input field in a data model, the user content flow driver may use the data model to determine a final result, e.g., a tax return, the specifics of a financial transaction, or whether to grant or deny a request for a loan. As such, the process may end. In one or more embodiments of the invention, prior to ending the process, a report may be generated and transmitted to an appropriate entity. For example, the report may be a tax return, loan application, insurance application, financial statement, or other report. In the examples, the report may be transmitted directly or indirectly by the declarative content engine to a government agency, lending company, or insurer.

However, when a determination is made that additional user data is desired, the process proceeds to Step 1114. In other words, the process proceeds to obtain additional user data.

In Step 1114, a new dynamic set of fields is generated by the user content flow driver in one or more embodiments of the invention. Specifically, the new dynamic set of fields may be generated by adding or subtracting one or more fields from the set of fields received in Step 1100. The new dynamic set of fields may also be generated by adding or subtracting one or more fields from a dynamic set of fields obtained in a previous iteration of the process described in Steps 1112-1134. As such, the user content flow driver may adjust the fields used in the application workflow based on new user data or changes to previously received user data. Adding or subtracting fields from a dynamic set of fields is discussed below and in Steps 1128-1134.

In Step 1116, the new dynamic set of fields is sorted using the priority field list in accordance with one or more embodiments of the invention. In sorting the new dynamic set of fields, the user content flow driver may organize the new dynamic set of fields for use in the application workflow. As such, the user content flow driver may sort the fields having the highest priority to be placed at the front of the application workflow and place the fields with low or no priority near the back of the application workflow. The priority field list is discussed in further detail below and in FIG. 9 in accordance with one or more embodiments of the invention.

In Step 1118, a request is received by the declarative content engine for application content next in the application workflow in one or more embodiments of the invention. In one or more embodiments of the invention, a user submits data based on an information request displayed with application content by the user experience player. In response, the user experience player may automatically send a request to the declarative content engine for additional application content.

In one or more embodiments of the invention, the application content next in the application workflow may include one or more user experience fields. For example, a user experience field may correspond to a splash screen, i.e., a graphical control element in the application that may introduce or conclude a particular topic with respect to user data. As such, declarative content for a particular user experience field may be transmitted to the user experience player and displayed as application content similar to other fields.

In one or more embodiments of the invention, the user sends a request to return to a previous position in the application workflow (e.g., back to a page previously displayed by the application). For example, the request may be directed to returning to application content corresponding to data already provided by the user for a specific user input field. For example, the user may want to modify previously entered data or provide additional information. Returning to a previous position in one or more embodiments of the invention is discussed below and in reference to FIG. 13.

In Step 1120, a next user input field is selected from the new dynamic set of fields in accordance with one or more embodiments of the invention. For example, when the new dynamic set of fields corresponds to a queue, a user input field may be reached in the queue after selecting one or more user experience fields from the queue.

In one or more embodiments of the invention, user input fields correspond to a user input tree. For example, data provided by a user for a particular user input field may provide additional questions to be asked of the user, while eliminating other questions in the user input tree. As such, the next user input field may be the next question in a particular branch of the question tree. Furthermore, the priority field list may be organized with respect to the user input tree and the new dynamic set of fields may be sorted accordingly.

In Step 1122, declarative content is generated based on the next user input field. In Step 1124, the declarative content is transmitted to a user experience player. Generating and transmitting the declarative content may be performed as discussed above.

In Step 1126, user data is received in response to the declarative content. The user data may be received in a similar manner as described in Step 1110.

In Step 1128, a determination is made whether to remove one or more fields from the new dynamic set of fields. Specifically, the user content flow driver may make the determination based on what data is missing in order to obtain a particular result using a data model. If the user data received in Step 1126 renders unnecessary or irrelevant one or more user input fields, whether a user has provided data for the respective user input field or not, the user content flow driver may determine to remove the unnecessary and irrelevant fields from the dynamic set of fields. If a determination is made to remove one or more fields from the new dynamic set of fields, the process proceeds to Step 1130. However, when it is determined to keep the previous fields in the dynamic set of fields, the process proceeds to Step 1132.

In Step 1130, one or more fields are selected for removal from the new dynamic set of fields in one or more embodiments of the invention. In one or more embodiments of the inventions, the user content flow driver may use a data model to determine which user input fields and user experience fields have been rendered moot by user data received from the user. Specifically, if the user content flow driver determines that the application workflow will avoid one or more specified user input fields or user experience fields based on submitted user data, the user content flow driver may designate the specified fields for removal from the next dynamic set of fields that is generated in Step 1114.

In Step 1132, a determination is made whether to add one or more fields to the new dynamic set of fields in accordance with one or more embodiments of the invention. In one or more embodiments of the invention, the user content flow driver makes the determination based on whether data for one or more user input fields are needed to obtain a particular result from a data model. If the needed user input fields lack a corresponding field in the new dynamic set of fields, the user content flow driver may select the needed user input field for addition to the current dynamic set of fields. The user content flow driver may do the same with user experience fields as well.

In one or more embodiments of the invention, the user content flow driver determines whether to include one or more user experience fields in the dynamic set of fields based on a pre-defined user model. For example, user experiences may be organized according to different educational levels or experience with a particular data collection process (e.g., preparing a tax return, applying for a loan, or participating in a particular financial transaction). As such, the user content flow driver may use data provided by a particular user to determine a particular user experience.

Upon determining the particular user experience, the user content flow driver may include one or more user experience fields in the dynamic set of fields to obtain the particular user experience for the user.

In Step 1134, one or more fields are selected for addition to the new dynamic set of fields. In one or more embodiments of the inventions, the user content flow driver may use the data model to determine which additional user input fields and/or user experience fields have been rendered necessary by user data received from the user. Specifically, if the user content flow driver determines that the dynamic set of fields is missing one or more specified user input fields or user experience fields, the user content flow driver may designate the specified fields for addition to the next dynamic set of fields that is generated in Step 1114.

In one or more embodiments of the invention, the removal and/or addition of fields may be performed by deleting fields from the previous dynamic set of fields or queue and/or adding new fields to the previous the previous dynamic set of fields or queue. Additionally or alternatively, the removal and/or addition of fields may be performed by generating a new dynamic set of fields without consideration of the previous dynamic set of fields. The new dynamic set of fields may exclude the fields for removal and include the fields to be added.

Turning to FIG. 12, FIG. 12 shows a flowchart describing a method for updating a priority field list for use in an application workflow. In Step 1200, user data is received by a user content flow driver. For more information regarding receiving user data, see FIGS. 10, 11.1 and 11.2 and the accompanying description.

In Step 1202, a set of fields is received by the user content flow driver. The set of fields in Step 1200 may correspond to the set of fields described with respect to Step 1100 or the new dynamic set of fields described with respect to Step 1114.

In Step 1204, one or more respective fields in the set of fields are designated with a score based on various priority parameters. The user content flow driver may select which priority parameters are applicable to a particular field and score the particular field accordingly. Throughout the application workflow, respective fields may be rescored based on new user data or modifications to existing information regarding a user. Scoring by the user content flow driver may also be relative between fields. Rather than an absolute score for a respective field, the user content flow driver may designate a particular field as being before or after another field.

In one or more embodiments of the invention, various priority parameters act as weights for determining a score for a respective field. For example, a particular user's educational background may be designated a specific multiplier in calculating a score, while the particular user's primary language may receive a different multiplier. As such, an accountant who primarily speaks English may have user input fields that are associated with experienced users scored highly. However, a tax professor who primarily speaks Russian may have user input fields scored highly that are associated with inexperienced users. Priority parameters associated with being a tax professor may be associated with user input fields for experienced users, but being a non-English speaker may receive increased weight and overcome the experienced user designation.

In one or more embodiments of the invention, priority parameters are based on one or more data models for computing a particular result. For example, priority parameters may provide a relative score for a particular user input field for a data model with respect to other user input fields for the same data model. To compute a particular result from a data model, for example, various types of data may be used in any case to calculate the particular result, while other types of data may be desired in particular instances. As such, a priority parameter may associate a user input field with a high score that is used in any case, while a user input field will receive a low score that is used in those particular instances.

In one or more embodiments of the invention, priority parameters are based on a logical order of data collection gathering with respect to various user input fields. For example, if a first user input field corresponds to an information request regarding whether a user has a spouse, a second user input field for requesting information on the spouse's name may be assigned a score close to the first input field's score. As such, the user content flow driver may use priority parameters to implement a predefined sequence of questions for the user.

In one or more embodiments of the invention, priority parameters are based on one or more user models corresponding to a logical order for a particular type of user. For example, a user model may be based on various user background characteristics, such as education level or which language is primarily spoken by a particular user. As such, a priority parameter may correspond to user data that designates a particular user's education level or which language is primarily spoken by a particular user. In one or more embodiments of the invention, the user content flow driver selects a particular user model based on A-B testing. The user content flow driver may also select a particular user model based on existing data known for the particular user. The particular user may also designate which user model (e.g., "easy") is preferred. For example, a predefined user model may correspond to inexperienced users, while another predefined user model may correspond to experienced ones. As such, various user experience fields may receive assigned priority parameters denoting whether the respective user experience field is used by an experienced user or an inexperienced user. The user content flow driver may determine whether a particular user is experienced or inexperienced, and score particular fields accordingly. For an experienced user, user input fields and/or user experience fields associated with experienced users may receive a high score, while user input fields and/or user experience fields associated with a low score may receive a low score. Neutral fields that apply to any users may receive an intermediate score.

In Step 1206, the one or more respective fields are ranked based on designated scores. Specifically, scores for various respective fields may be compared between other fields to determine an organized ranking of fields in the set of fields. For example, fields with high scores may be placed at the beginning of the list, while fields with low scores may be placed at the end of the list. The ranking may include a list with actual fields being ordered in the list.

In Step 1208, the priority field list is generated or updated based on the ranking. For example, the priority field list may match the ranking in Step 1206. In one or more embodiments of the invention, the user content flow driver modifies the location of a respective field in the priority field list based on the respective field's score. For example, if a respective field receives a high score, the respective field may be moved up in the list.

In one or more embodiments of the invention, one or more fields are inserted into the priority field list without respect to the ranking. For example, user experience fields associated with a user introduction may be placed near the beginning of the priority field list. A user input field requesting information on a user's first and last name may be designated as the first user input field in the priority field list.

Turning to FIG. 13, FIG. 13 shows a flowchart describing a method for moving to a previous page in an application workflow. In Step 1300, a user content flow driver receives user data. Receiving user data may be performed as discussed above with reference to FIGS. 10, 11.1 and 11.2.

In Step 1302, a request is received to return to a previous position in an application workflow. For example, a user may decide to return to application content for a previous user input field or user experience field. The request may correspond to a user action, such as using a mouse cursor to go back to a previous page in the application workflow. In other words, the user may select a back navigation button in a displayed application window. Other techniques for the user to request going back may be used without departing from the scope of the invention.

In Step 1304, a set of fields is received by the user content flow driver in one or more embodiments of the invention. The set of fields in Step 1304 may correspond to the set of fields described with respect to Step 1100 or the new dynamic set of fields described with respect to Step 1114. In one or more embodiments of the invention, the user content flow driver obtains the set of fields based on user data. Thus, if the request to go back includes additional user data that modified previously sent user data, the dynamic set of fields may be different than when the user was going forward through the application. In other words, some previously presented fields may be deemed irrelevant, while other fields, such as user experience fields may be deemed relevant.

In Step 1306, the set of fields are sorted using a priority field list in accordance with one or more embodiments of the invention. Sorting the set of fields may be performed as discussed above with reference to Step 1116 of FIG. 11.2.

In Step 1308, a cursor position is determined in the set of fields in one or more embodiments of the invention. In one or more embodiments of the invention, the cursor position is the current location in the application workflow that is being executed by the application. For example, the cursor position may correspond to the application content last displayed by a user experience player. By way of another example, the cursor position may correspond to the field ID of the previously requested field and the current field being displayed when the user requests to go back. In one or more embodiments of the invention, as the user is using the application, the user content flow driver tracks only the current field identifier, which is the cursor position. In other words, the changes to the dynamic set of fields and/or queue may not be tracked. In some embodiments of the invention, the changes to the dynamic set of fields and/or queue are tracked only for purposes unrelated to navigation, such as product testing. Thus, obtaining the cursor position may be performed from the tracking data.

In Step 1310, a previous field is identified that corresponds to the previous position from the cursor position. Between requesting to return to the previous position and reaching the cursor position, the user content flow driver may be using a different set of fields from the ones utilized when the cursor position was at the previous position. As such, the application content displayed previously to the user at the previous position may no longer be accessible based on the current user data. In other words, the user content flow driver may identify the cursor position of the fields in the newly sorted set of fields that are sorted in Step 1306 and select an immediate previous field from the cursor position in the newly sorted set of fields. Because the newly sorted set of fields may be different than when the user moved forward through the application even when the priority field list does not change, the resulting field selected may be different than that which was previously displayed to the user.

In Step 1312, application content is obtained for the previous field in accordance with one or more embodiments of the invention. After identifying the previous field, the user content flow driver may send the previous field to the declarative content engine.

In Step 1314, declarative content is generated that is based on the application content for the previous field. In Step 1316, the declarative content is transmitted to a user experience player. Generating and transmitting the declarative content in one or more embodiments may be performed as discussed above with reference to FIG. 7.

Figure 14:
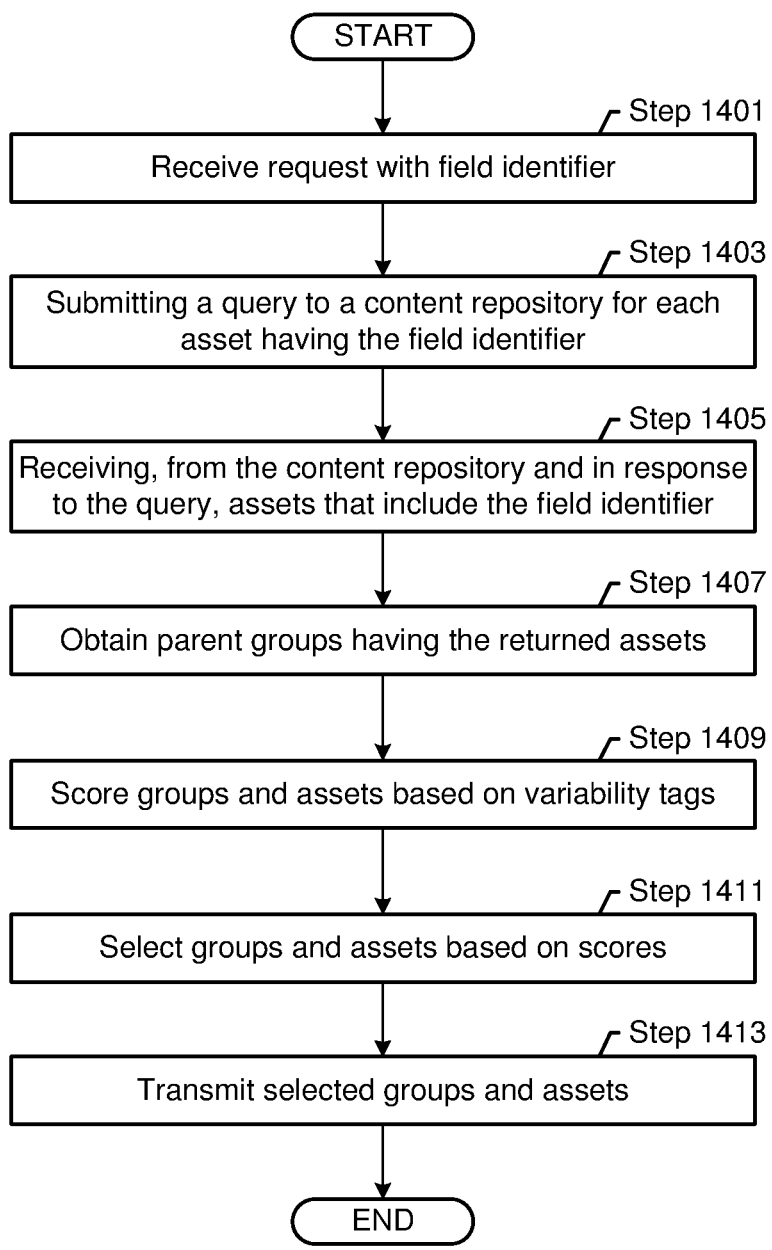
Figure 15:
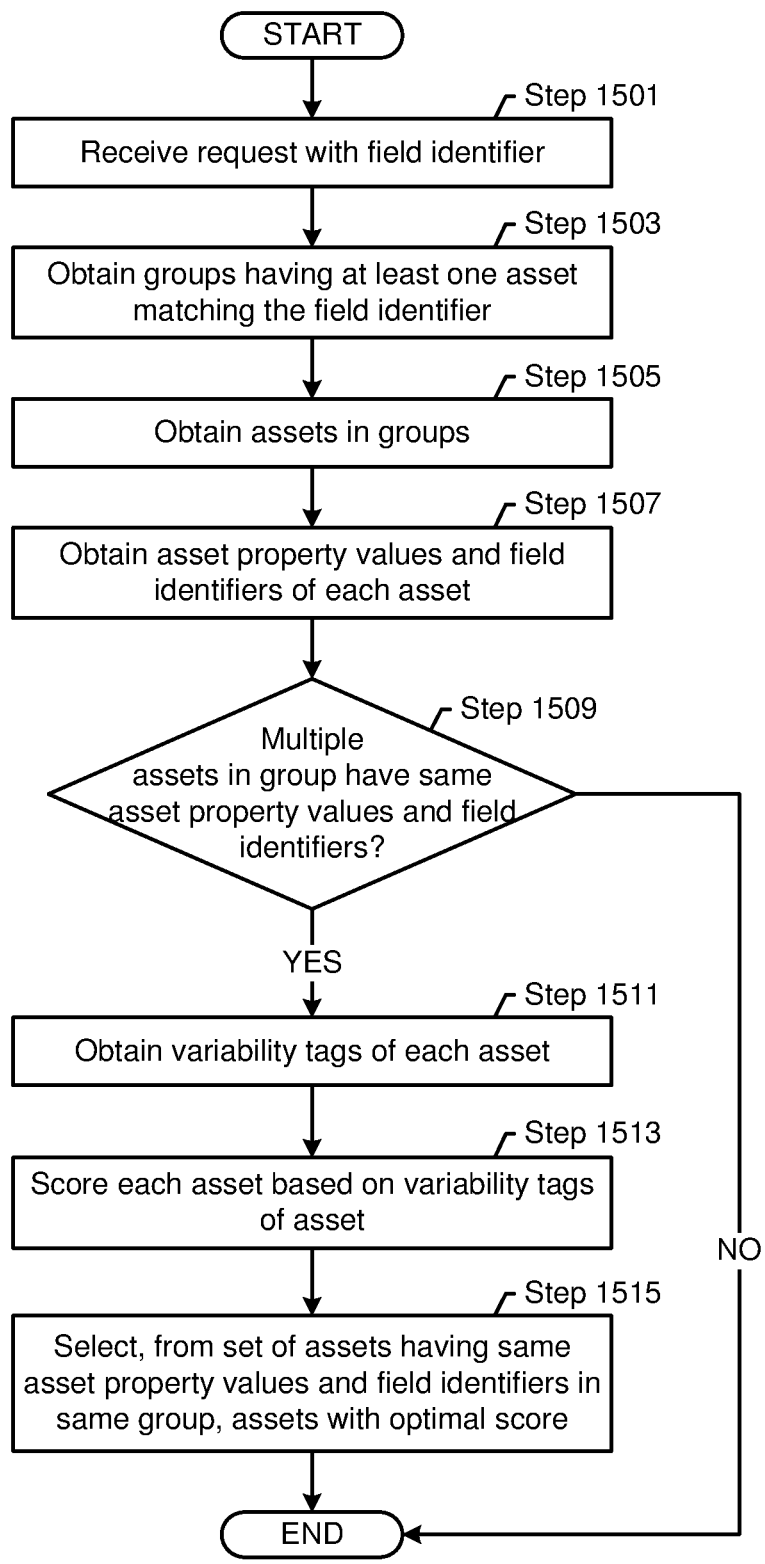
Figure 16:
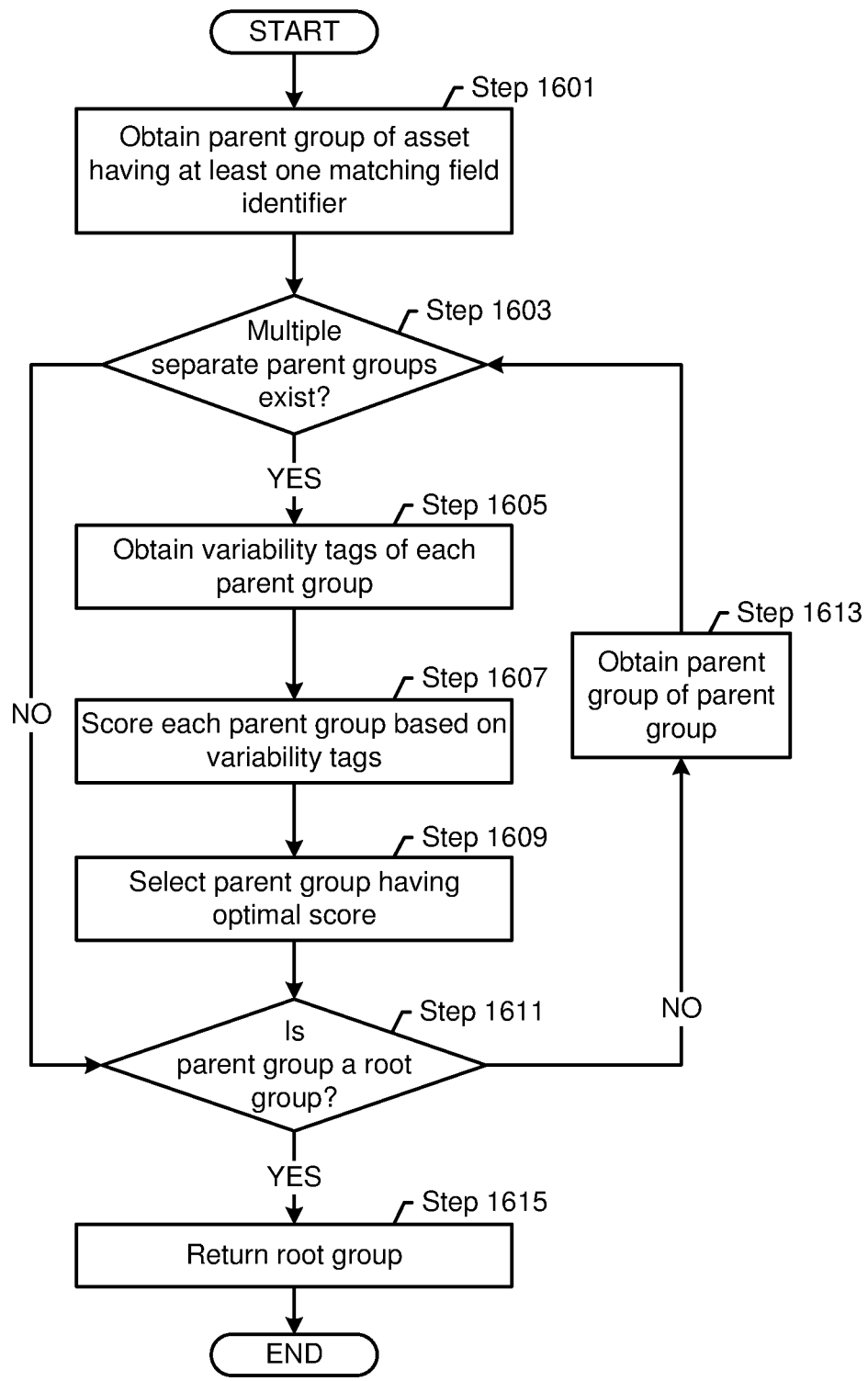

Turning to FIGS. 14-17, FIGS. 14-17 are directed to a method for storage retrieval of application content in accordance with one or more embodiments of the invention. For example, FIGS. 14-15 describe the obtaining of groups and assets that correspond to a field identifier from a content repository in accordance with one or more embodiments of the invention. FIG. 16 describes the selection of groups in accordance with one or more embodiments of the invention.

FIG. 14 shows a flowchart for responding to a request for application data in accordance with one or more embodiments of the invention. In Step 1401, a request with a field identifier is received in accordance with one or more embodiments of the invention. For example, the DCE or a component on the DCE may transmit the request to the content asset loader. When the DCE or other component transmits the request, the component may include the field identifier and any variability tags of the UXP. Specifically, the DCE may select and transmit a field identifier of a highest priority and an incomplete field. With the field identifier, the DCE may collect and transmit one or more variability tags describing the context of the UXP. The variability tags may be obtained from the UXP in the request from the UXP for the next application data, detected by the DCE when interacting with the UXP, through other actions, or through any combination thereof. The request may be received as a procedure call, a message, or other mechanism for communication.

In Step 1403, a query is submitted to the content repository for each asset having the field identifier in accordance with one or more embodiments of the invention. In particular, the content asset loader sends a query to the content repository for any assets that include the requested field identifier. The content repository searches through the assets to find matching assets. The search may be performed using an index.

In Step 1405, in response to the request, assets that include the field identifier are received from the content repository in accordance with one or more embodiments of the invention. In particular, the content repository may respond with the hierarchical structure of each hierarchy that includes an asset having the field identifier. The hierarchical structure provided by the content repository includes root groups, parent groups, assets, and the relationships between the groups/assets.

In Step 1407, parent groups having the returned assets are obtained in accordance with one or more embodiments of the invention. In one or more embodiments of the invention, the content asset loader obtains the parent groups of each group having an asset matching the field identifier from the returned hierarchy.

In Step 1409, groups and assets are scored based on variability tags in accordance with one or more embodiments of the invention. Different mechanisms may be performed for scoring groups and assets. For example, in some embodiments, all groups and assets are scored. In other embodiments, only alternative groups and assets are scored. The scoring may be performed by matching the variability tags in the returned hierarchy with the variability tags in the content repository, and obtaining the corresponding scores of the matching variability tags from the content repository. A mathematical combination of the corresponding scores may be calculated to obtain a score for each asset and/or group.

In Step 1411, groups and assets are selected based on scores in accordance with one or more embodiments of the invention. In one or more embodiments of the invention, the selection is based on the optimal score. For example, if the highest score is the optimal score, then an alternative asset/group having the highest score is selected from a set of alternative assets/groups. If the lowest score is the optimal score, then an alternative asset/group having the lowest score is selected from a set of alternative assets/groups. Assets and/or groups that are not conflicting or not alternatives of each other are selected. In some embodiments, selecting a group or asset may correspond to maintaining a data structure having the asset ID or group ID of the selected groups or assets. Other mechanisms for tracking which assets are selected may be used without departing from the scope of the invention.

In Step 1413, the selected groups and assets are transmitted in accordance with one or more embodiments of the invention. In one or more embodiments of the invention, the hierarchy having the root group with selected groups and assets is transmitted back to the requesting application. Not selected assets or groups may be pruned from the hierarchy. The hierarchy is transmitted as application content to the DCE or a component of the DCE. After being transmitted, the DCE may modify the application content to declarative content and transmit the declarative content to the DCE.

As shown above, one or more embodiments of the invention bifurcate the optimization of an application for a particular computing device. In particular, the content repository and the asset content loader tailor the amount and content of the data displayed on the particular computing device, while the UXP on the particular computing device formats the application and data for the particular computing device to take advantage of the hardware of the device.

FIGS. 15 and 16 show a more detailed flowchart for selecting groups and assets to respond to a request in accordance with one or more embodiments of the invention. Specifically, FIG. 15 shows a flowchart for selecting assets in accordance with one or more embodiments of the invention. In Step 1501, a request with a field identifier is received in accordance with one or more embodiments of the invention. The request may be received in a same or similar manner as discussed above with reference to Step 1401 of FIG. 14.

In Step 1503, groups having at least one asset matching the field identifier are obtained in accordance with one or more embodiments of the invention. For example, the asset content loader may submit a query to the content repository with the requested field identifier. The content repository may respond with each hierarchy having an asset with the field identifier. Alternatively, the content repository may respond with only the immediate parent group of each asset.

In Step 1505, assets in the groups are obtained in accordance with one or more embodiments of the invention. In particular, assets in each group are identified. The assets in the group are identified regardless of whether the assets match the field identifier transmitted in the original request.

In Step 1507, the asset property values and field identifiers of each asset are obtained in accordance with one or more embodiments of the invention. For each asset, the asset content loader obtains the asset property values and the field identifiers to determine whether the asset is an alternative asset to a previously examined asset.

In Step 1509, a determination is made whether multiple assets in the group have the same asset property values and field identifiers in accordance with one or more embodiments of the invention. The determination is made with respect to each asset and each field identifier, regardless of whether the field identifier is in the original request in accordance with one or more embodiments of the invention. If multiple assets do not have the same asset property values and field identifiers, then all assets in the group are selected and the flow may proceed to end. Alternatively, if multiple assets have the same field identifier and the same asset property values, then the multiple assets are alternatives. Thus, if at least two assets have the same asset property values and field identifiers, then the flow may proceed to Step 1511 in accordance with one or more embodiments of the invention.

In Step 1511, variability tags of each asset are obtained in accordance with one or more embodiments of the invention. In particular, for each asset that has the same field identifier and the same asset property values, the variability tags of the asset are obtained. Obtaining the variability tags may be performed, for example, by receiving the variability tags from the data repository and/or extracting the variability tags from the asset.

In Step 1513, each asset is scored based on the variability tags of the asset in accordance with one or more embodiments of the invention. The scoring may be performed as discussed above with reference to Step 1409 in FIG. 14. Various scoring systems may be used. In one or more embodiments of the invention, regardless of the scoring system used, the scoring system is consistently applied to each asset that is compared in order to obtain a score for the asset. The following are some examples of scoring systems. Other scoring systems may be used without departing from the scope of the invention. In at least some embodiments, the mathematical calculation is a summation of the score of each matching variability tag in the request and the asset. The summation may be reduced by variability tags that do not match. For example, if the asset has any additional variability tags that are not in the request, the score may be reduced by the score in the content repository of the additional variability tags. Additionally or alternatively, in some embodiments, if the request has any additional variability tags that are not in the asset, the score may be reduced by the score in the content repository of the additional variability tags.

The following is an example of scoring in accordance with one or more embodiments of the invention. In the following example, consider the scenario in which the request has variability tags: English Language, Professional Edition, and Large Form Factor. Further, in the example, Asset X has variability tags: English Language, Student Edition, Small Form Factor, and Alpha Test Case. The content repository has the following score assignments: English Language has score 500, Professional Edition has score 60, Student Edition has score 60, Small Form Factor has score 30, Large Form Factor has score 25, and Alpha Test Case has score 8. In the example, Asset X matches in the English Language. Thus, Asset X may be assigned a score of 500. If the score is reduced, the score may be reduced by 60 and 25 for not having the form factor or edition variability tags that are in the request, resulting in a total score of 415. The score may additionally or alternatively be reduced by 60, 30, and 8 for having an edition, form factor, and test case that is not in the request resulting in a total score of 317 (i.e., 415−60−30−8=317) or 402 (i.e., 500−60−30−8=317). Alternative assets are similarly scored to obtain matching scores for each asset.

In Step 1515, from the set of assets having the same asset property values and field identifiers in the same group, assets with the optimal score are selected in accordance with one or more embodiments of the invention. Selecting assets with optimal scores may be performed as discussed above with respect to Step 1411 of FIG. 14. Specifically, from a set of alternative assets, the assets with the optimal scores are selected. Assets that are not alternatives of each other and are in the same group may also be selected.

In one or more embodiments of the invention, after selecting the assets, groups may also be selected amongst possible conflicting groups. For example, one group may be for large form factor or professional edition, while another group having fewer assets is for small form factor or home edition. FIG. 16 shows a flowchart for selecting groups in accordance with one or more embodiments of the invention. In Step 1601, parent group(s) of an asset having at least one matching field identifier is obtained in accordance with one or more embodiments of the invention. The parent groups may be in the same hierarchy or in different hierarchies. Obtaining the parent group may correspond to identifying the parent group through a reference from the parent group to the asset or from the asset to the parent group.

In Step 1603, a determination whether multiple separate parent groups exist in accordance with one or more embodiments of the invention. If multiple separate parent groups exist, then the multiple separate parent groups are alternatives of each other. If multiple separate parent groups do not exist, the flow may proceed to Step 1615 (discussed below).

If multiple separate parent groups exist, then the flow proceeds to Step 1605. In Step 1605, variability tags of each parent group are obtained in accordance with one or more embodiments of the invention. In particular, for each group that has an asset with the same field identifier, the variability tags of the group are obtained. Obtaining the variability tags may be performed, for example, by receiving the variability tags from the data repository and/or extracting the variability tags from the group.

In Step 1607, each parent group is scored based on the variability tags in accordance with one or more embodiments of the invention. Scoring the parent group may be performed in a same or similar manner as discussed above with reference to Step 1513 in accordance with one or more embodiments of the invention. In some embodiments, the same scoring system is used for scoring assets as for scoring groups. In other embodiments, different scoring systems are used. Despite which scoring system is used, the used scoring system is consistently applied across the compared groups.

In Step 1609, the parent group having the optimal score is selected in accordance with one or more embodiments of the invention. Selecting the parent group may be performed as discussed above with reference to Step 1411 of FIG. 14.

In some embodiments, different groups in the same hierarchy are not alternatives of each other. In other words, the entire hierarchy of groups, with the exception of some non-selected assets is transmitted as application content to the DCE. In other embodiments, different groups in the same hierarchy may be alternatives of each other. In such embodiments, an additional step may be performed to identify alternatives by determining whether the same field identifier is in multiple groups in the same hierarchy, regardless of whether the field identifier is in a request. If a same field identifier is in the same hierarchy and is in different groups, the scoring mechanism and selection mechanism may be performed as discussed above, with the exception that the selection ensures the field identifier in the request is in the final selected hierarchy.

Continuing with FIG. 16, in Step 1616, a determination is made whether the parent group is a root group in accordance with one or more embodiments of the invention. As discussed above, a parent group is a root group when the parent group does not have a parent. Determining whether the parent group is a root group may be performed by determining whether any group references the parent group as a child or determining whether the parent group references another group as a parent. Other mechanisms for determining whether a group is a parent group may be used without departing from the scope of the invention.

If the parent group is not a root group, in Step 1613, the parent group of the parent group is obtained in accordance with one or more embodiments of the invention. In other words, the current group's parent from the hierarchy is processed. Obtaining the parent group may correspond to identifying the parent group through a reference from the parent group to the current group or from the current group to the parent group. By following the reference, the parent group may be obtained.

If the parent group is a root group, in Step 1615, the root group is returned in accordance with one or more embodiments of the invention. In other words, the hierarchy is transmitted along with any selected groups and assets. Assets or groups that are not selected may be omitted from the hierarchy returned to the DCE. Transmitting the hierarchy may be performed as discussed above with reference to Step 1413 of FIG. 14.

FIGS. 17, 18, 19, and 20 show examples in accordance with one or more embodiments of the invention. The following examples are for explanatory purposes only and not intended to limit the scope of the invention. FIG. 17 shows an example populated user interface at the UXP. Specifically, FIG. 17 shows a populated template that is presented to a user. As shown in FIG. 17, the template includes spaces for a topic context (1702), category title (1704), explanation (1706), prompt description (1708), graphical user interface (GUI) field (1710), an affirmative description (1712), a negative description (1714). The affirmative description (1712) and the negative description (1714) correspond to user input fields for a user content flow driver. The explanation (1706) may correspond to a user experience field. Depending on a particular user, the user content flow driver may select an explanation for one type of user over another. The template also includes a forward navigation button (1716) and a backward navigation button (1718). The text in the template is from the content repository. Formatting, buttons, and GUI fields are defined by the UXP as part of the selected template in accordance with one or more embodiments of the invention.

The topic context (1702) is a place for storing the context of the question presented in the user interface. The category title (1704) provides the overall category of the question. The explanation (1706) provides background material that may assist a user in answering the question. The prompt description (1708) or prompt is the question that is presented to the user. The GUI fields (1710) are selectable buttons that allow the user to answer the question. The affirmative description (1717) informs the user as to the meaning behind a yes answer while the negative description (1714) provides the meaning of a no answer. Navigation buttons allow the user to move forward or backward through the application.

In order to create the example user interface shown in FIG. 17, the content repository stores text for FIG. 17. FIG. 18 shows example contents of the content repository (1800) to generate the user interface shown in FIG. 17. As shown in FIG. 18, the content repository may be separated into at least three data structures. A first data structure may be a description data structure (1802) that has assets providing a description of the various parts of a corresponding field. Each row in the description data structure (1802) is a separate asset or group. Columns in the description data structure may correspond to ID (1804), asset property values (1806), variability tags (1808), and asset content (1810). The ID (1804) is the unique identifier of the asset. The asset property values (1806) include the field or group identifier to which the asset relates and the type or function of the asset in the field or group. The variability tags (1808) include the form factor, language (i.e., "en" for English), and SKU. The asset content (1810) includes a description, which is the text and the font of the text in the asset content.

The second data structure may be an option data structure (1812). Each row in the option data structure (1812) is a separate asset that corresponds to an option that may be selected. Columns in the description data structure may correspond to ID (1814), asset property values (1816), variability tags (1818), and asset content (1820). The ID (1814) is the unique identifier of the asset. The asset property values (1816) include the field identifier to which the asset relates and whether the option corresponding to the asset is defined as true or false. The variability tags (1818) include the form factor, language (i.e., "en" for English), and SKU. The asset content (1820) includes a description, which is the text describing the meaning of the respective answers.

A third data structure may be a relational data structure (1822) that relates the parent group to the child field ID and provides a topic for the overall data structure. In other words, the third data structure may define the hierarchy.

FIG. 18 shows only one example of data structures for the content repository. Other mechanisms for storing the data and data structures may be used without departing from the scope of the invention.

Figure 19:
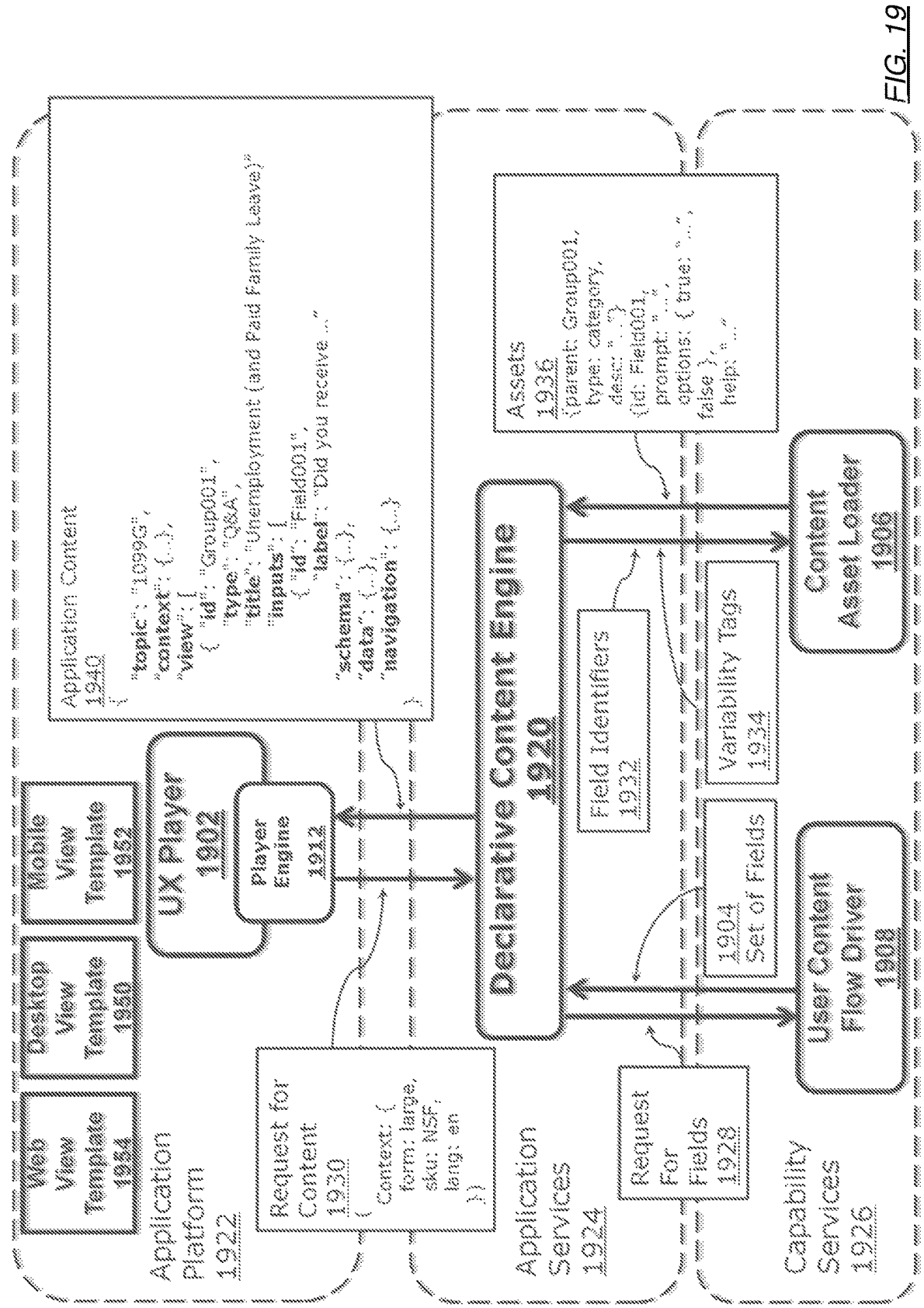

FIG. 19 shows an example interaction between a user experience player, a declarative content engine, a user content flower driver, and a content asset loader in accordance with one or more embodiments of the invention. The example below and in FIG. 19 is for example purposes only and not intended to limit the scope of the invention. As shown in FIG. 19, the interaction may be divided in layers between an application platform (1922), application services (1924), and capability services (1926). Specifically, the application platform (1922) includes a user experience player (UX Player) (1902) that includes a player engine (1912). The application platform (1922) may also include various templates, such as a web view template (1954), a desktop view template (1950), and a mobile view template (1952) for use by the UX Player (1902). In the application services (1924) is a declarative content engine (1920). In the capability services is a user content flow driver (1908) and a content asset loader (1906).

The declarative content engine (1920) may send a request for fields (1928) to the user content flow driver (1908). In response, the user content flow driver (1908) may send a set of fields (1904) to the declarative content engine (1920). The declarative content engine (1920) may send a field identifier (1932) based on the highest priority field of the set of fields (1904) to the content asset loader (1906) along with variability tags (1934). As such, the content asset loader (1906) may send assets (1936) back to the declarative content engine (1920). The declarative content engine may then generate declarative content, which may be sent to the UX player (1902). The declarative content may be processed to produce application content (1940).

Turning to FIG. 20.1, FIG. 20.1 shows a priority field list. A priority field list (2002) includes the following ordered fields: "Field 1: Do You Have Insurance?" (2004), which is a user input field; "Field 2: Are you SURE you've got insurance?" (2008), which is a user input field; "Field 3: Great! You've Got No Penalty!" (2010), which is a user experience field; "Field 4: Sorry, You've Got a Penalty. Let's see if you qualify for an exemption" (2012), which is a user experience field; "Field 5: Do You Have a 1095A?" (2014), which is a user input field; "Field 6: Can you claim to be a member of an Indian Tribe?" (2016), which is a user input field; and "Field 7: Conclusion" (2018), which is a user experience field. As shown, the priority field list may include all fields including both whether the user has insurance or does not have insurance.

FIG. 20.2 shows the dynamic set of fields with user data and cursor position at time t1 (2020). For the purposes of the example only, consider the scenario in which the system defaults to assuming that a user has insurance. In such a scenario, field 1 (2004), field 3 (2010), field 5 (2014), and field 7 (2018) are in the dynamic set of fields. In other words, based on the system default, only the fields related to having insurance are in the dynamic set of fields. Further, the dynamic set is ordered according to the priority field list. The cursor position (2022) is initially at field 1 (2004), which is presented to the user. In response to the presentation of field 1 (2004), the example user may select "No."

FIG. 20.3 shows the dynamic set of fields with user data and cursor position at time t2 (2030). The inclusion of user data in the dynamic set of fields is for explanatory purposes only. Because the user selected no (2032), the dynamic set of fields is updated to include field 4 (2012), field 6 (2016), and field 7 (2018). The cursor position (2034) moves to field 4 (2012), which is presented to the user. In other words, the user is notified that the user has a penalty and the application is determining whether the user qualifies for an exemption. In response to the presentation of field 4 (2012), the example user may select to move forward.

FIG. 20.4 shows the dynamic set of fields with user data and cursor position at time t3 (2040). Because only information is presented, the dynamic set of fields does not change from time t2. The cursor position (2042) moves to field 6 (2016), which is presented to the user. In response to the presentation of field 1 (2004), the example user may select "Yes" and select the go back navigation button (2044).

FIG. 20.5 shows the dynamic set of fields with user data and cursor position at time t4 (2050). Because the user selected that the user qualifies for an exemption, the dynamic set of fields is updated to only the relevant fields namely that the user qualifies for an exemption. Thus, when the user selects to go back, rather than having the user experience field indicating that the user has a penalty that was previously displayed, field 3 (2010) is displayed informing the user that the user does not have a penalty. The cursor position (2052), which was at field 6 (2016) in the prior dynamic set moves to field 3 (2010), which is presented to the user.

As shown in the example, the dynamic set of fields may continually change depending on the user data. Thus, that which the user views moving forward and backward through the application may change in accordance with one or more embodiments of the invention.

Figure 21:
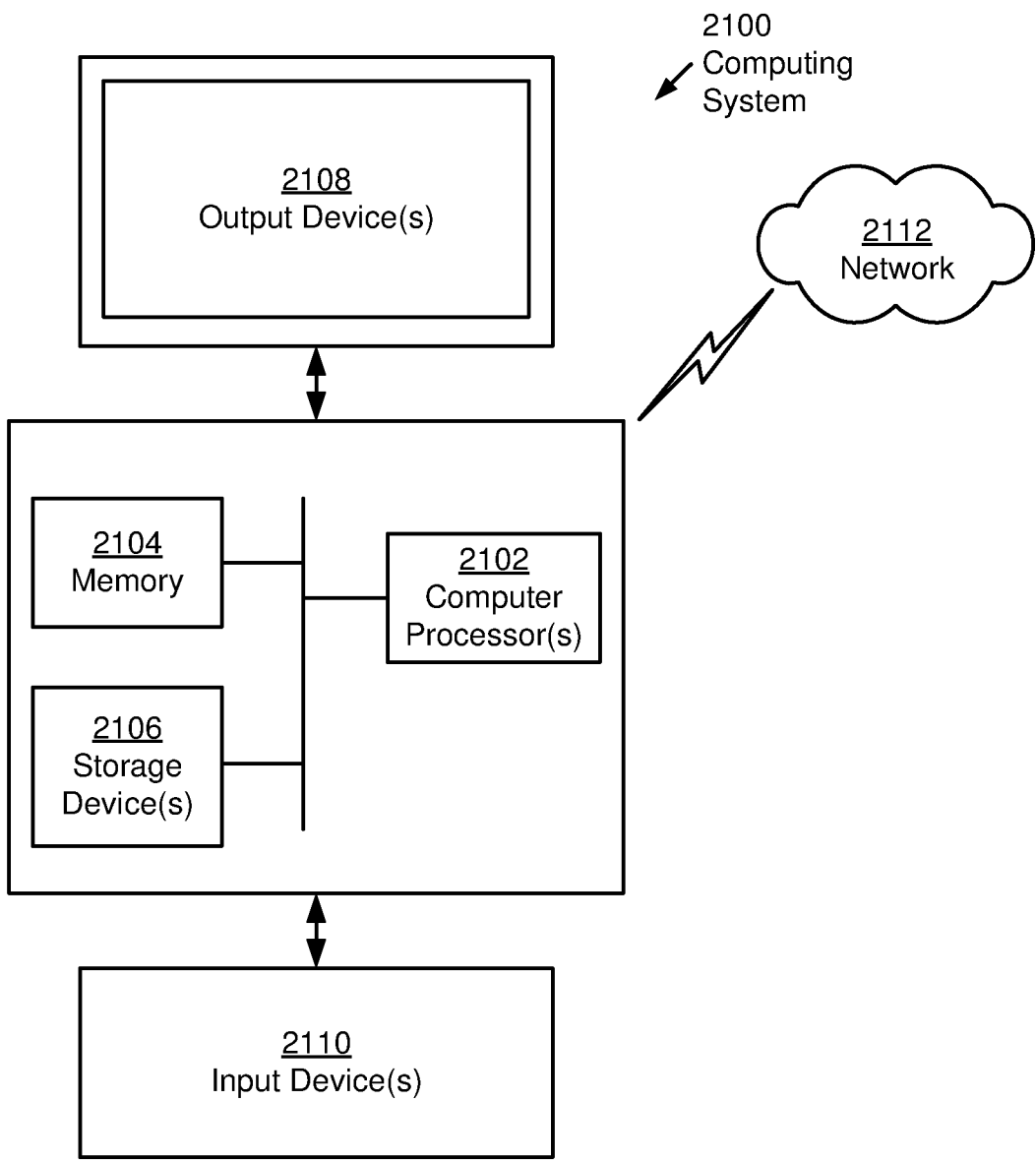
FIG. 21 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 21, the computing system (2100) may include one or more computer processor(s) (2102), associated memory (2104) (e.g., random access memory (RAM), cache memory, flash memory, etc.), one or more storage device(s) (2106) (e.g., a hard disk, an optical drive such as a compact disk (CD) drive or digital versatile disk (DVD) drive, a flash memory stick, etc.), and numerous other elements and functionalities. The computer processor(s) (2102) may be an integrated circuit for processing instructions. For example, the computer processor(s) may be one or more cores, or micro-cores of a processor. The computing system (2100) may also include one or more input device(s) (2110), such as a touchscreen, keyboard, mouse, microphone, touchpad, electronic pen, or any other type of input device. Further, the computing system (2100) may include one or more output device(s) (2108), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (2100) may be connected to a network (2112) (e.g., a local area network (LAN), a wide area network (WAN) such as the Internet, mobile network, or any other type of network) via a network interface connection (not shown). The input and output device(s) may be locally or remotely (e.g., via the network (2112)) connected to the computer processor(s) (2102), memory (2104), and storage device(s) (2106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2100) may be located at a remote location and connected to the other elements over a network (2112). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, by a user content flow driver executing on a set of processors and from a declarative content engine, a request for fields;
   generating, by the user content flow driver executing on the set of processors, a set of fields in response the request for fields;
   transmitting, by the user content flow driver executing on the set of processors in response to the request for fields, the set of fields to the declarative content engine;
   receiving, by a content asset loader executing on the set of processors in response to transmitting the set of fields to the declarative content engine, a field identifier with a plurality of variability tags;
   selecting, by the content asset loader executing on the set of processors, a content that corresponds to the plurality of variability tags by pruning one or more assets and parent groups from a hierarchical data structure to form the content, wherein selecting the content further comprises:
      submitting a query to a content repository;
      receiving, from the content repository, a plurality of assets that include the field identifier;
      obtaining a plurality of parent groups having the plurality of assets;
      scoring the plurality of assets and the plurality of parent groups; and
      selecting a parent group of the plurality of parent groups and an asset of the plurality of assets based on the scoring; and
   transmitting, by the content asset loader executing on the set of processors, the content to the declarative content engine;
   transmitting, by the set of processors, the content to the declarative content engine.

2. The method of claim 1, wherein pruning comprises:
   pruning the plurality of parent groups and the plurality of assets from the hierarchical data structure based on the scoring to select the parent group and the asset that form the content.

3. The method of claim 1, wherein the plurality of variability tags are received by the declarative content engine from a user experience player and define a context in which the asset and the parent group are to be used and identify one or more of a platform type, a form factor, a device capability, a language preference, a user profile, a user emotional state, and an edition of an application.

4. The method of claim 1, further comprising:
   selecting the field identifier based on a highest priority field of the set of fields.

5. The method of claim 1, further comprising:
   receiving the request for fields in response to the declarative content engine receiving a request for content from a user experience player.

6. The method of claim 1, further comprising:
transmitting the set of fields with a user input field that corresponds to a data request to a user and is presented on a user experience player.

7. A system comprising:
a set of processors;
a memory coupled to the set of processors comprising instructions;
the memory comprising a user content flow driver of an application, wherein the user content flow driver executes on the set of processors, uses the memory, and is configured for:
receiving, by the set of processors from a declarative content engine, a request for fields;
generating, by the user content flow driver executing on the set of processors, a set of fields in response the request for fields;
transmitting, by the user content flow driver executing on the set of processors in response to the request for fields, the set of fields to the declarative content engine;
the memory further comprising a content asset loader of the application, wherein the content asset loader executes on the set of processors, uses the memory, and is configured for:
receiving, by the content asset loader executing on the set of processors in response to transmitting the set of fields to the declarative content engine, a field identifier with a plurality of variability tags;
selecting, by the content asset loader executing on the set of processors, a content that corresponds to the plurality of variability tags by pruning one or more assets and parent groups from a hierarchical data structure to form the content, wherein selecting the content further comprises:
submitting a query to a content repository;
receiving, from the content repository, a plurality of assets that include the field identifier;
obtaining a plurality of parent groups having the plurality of assets;
scoring the plurality of assets and the plurality of parent groups; and
selecting a parent group of the plurality of parent groups and an asset of the plurality of assets based on the scoring; and
transmitting, by the set of processors, the content to the declarative content engine.

8. The system of claim 7, wherein pruning comprises:
pruning the plurality of parent groups and the plurality of assets from the hierarchical data structure based on the scoring to select the parent group and the asset that form the content.

9. The system of claim 7, wherein the plurality of variability tags is received by the declarative content engine from a user experience player and define a context in which the asset and the parent group are to be used and identify one or more of a platform type, a form factor, a device capability, a language preference, a user profile, a user emotional state, and an edition of the application.

10. The system of claim 7, wherein the application is further configured for:
selecting the field identifier based on a highest priority field of the set of fields.

11. The system of claim 7, wherein the application is further configured for:
receiving the request for fields in response to the declarative content engine receiving a request for content from a user experience player.

12. The system of claim 7, wherein the application is further configured for:
transmitting the set of fields with a user input field that corresponds to a data request to a user and is presented on a user experience player.

13. A non-transitory computer readable medium for providing user content, comprising computer readable program code for:
receiving, by a user content flow driver executing on a set of processors and from a declarative content engine, a request for fields;
generating, by the user content flow driver executing on the set of processors, a set of fields in response the request for fields;
transmitting, by the user content flow driver executing on the set of processors in response to the request for fields, the set of fields to the declarative content engine;
receiving, by a content asset loader executing on the set of processors in response to transmitting the set of fields to the declarative content engine, a field identifier with a plurality of variability tags;
selecting, by the content asset loader executing on the set of processors, a content that corresponds to the plurality of variability tags by pruning one or more assets and parent groups from a hierarchical data structure to form the content, wherein selecting the content further comprises:
submitting a query to a content repository;
receiving, from the content repository, a plurality of assets that include the field identifier;
obtaining a plurality of parent groups having the plurality of assets;
scoring the plurality of assets and the plurality of parent groups; and
selecting a parent group of the plurality of parent groups and an asset of the plurality of assets based on the scoring; and
transmitting, by the set of processors, the content to the declarative content engine.

14. The non-transitory computer readable medium of claim 13, wherein pruning comprises:
pruning the plurality of parent groups and the plurality of assets from the hierarchical data structure based on the scoring to select the parent group and the asset that form the content.

15. The non-transitory computer readable medium of claim 13, wherein the plurality of variability tags are received by the declarative content engine from a user experience player and define a context in which the asset and the parent group are to be used and identify one or more of a platform type, a form factor, a device capability, a language preference, a user profile, a user emotional state, and an edition of an application.

16. The non-transitory computer readable medium of claim 13, further comprising:
selecting the field identifier based on a highest priority field of the set of fields.

17. The non-transitory computer readable medium of claim 13, further comprising:
receiving the request for fields in response to the declarative content engine receiving a request for content from a user experience player.

* * * * *